(12) United States Patent
Patnaik et al.

(10) Patent No.: US 8,167,725 B1
(45) Date of Patent: May 1, 2012

(54) SYSTEM AND METHOD FOR USING A GAME TO INTERACT WITH TELEVISION PROGRAMS

(75) Inventors: Pratyus Patnaik, San Francisco, CA (US); Nathan Arthur Etter, San Jose, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,736

(22) Filed: Sep. 26, 2011

Related U.S. Application Data

(63) Continuation of application No. 13/070,757, filed on Mar. 24, 2011.

(51) Int. Cl.
*A63F 9/00* (2006.01)

(52) U.S. Cl. .................................. 463/42; 463/40; 463/9

(58) Field of Classification Search .......... 463/9, 40–42; 273/138.2; 725/13, 62; 705/35; 716/110
See application file for complete search history.

(56) References Cited

U.S. PATENT DOCUMENTS

| | | | |
|---|---|---|---|
| 6,193,610 B1 * | 2/2001 | Junkin ............................ | 463/40 |
| 6,439,997 B1 | 8/2002 | Brasseur et al. | |
| 6,447,396 B1 | 9/2002 | Galyean, III et al. | |
| 6,968,243 B1 | 11/2005 | Oh | |
| 7,044,375 B2 | 5/2006 | Scott | |
| 7,258,275 B1 | 8/2007 | Reddy | |
| 7,770,143 B2 * | 8/2010 | Hughes ........................ | 716/110 |
| 7,789,305 B2 | 9/2010 | Howcroft et al. | |
| 7,967,292 B2 * | 6/2011 | Katz et al. .................. | 273/138.2 |
| 8,019,641 B2 * | 9/2011 | Foroutan ......................... | 705/12 |
| 8,051,452 B2 * | 11/2011 | Arseneau et al. .............. | 725/74 |
| 8,051,453 B2 * | 11/2011 | Arseneau et al. .............. | 725/94 |
| 8,073,792 B2 * | 12/2011 | Hughes ......................... | 706/21 |
| 2003/0066072 A1 | 4/2003 | Creed et al. | |
| 2003/0149616 A1 | 8/2003 | Travaille | |
| 2004/0117831 A1 | 6/2004 | Ellis et al. | |
| 2005/0272495 A1 | 12/2005 | Penner et al. | |
| 2006/0178193 A1 | 8/2006 | Hunter | |

(Continued)

FOREIGN PATENT DOCUMENTS

CN 101202881 A 6/2008

(Continued)

OTHER PUBLICATIONS

Idolvote app for iPhone release date Mar. 29, 2010.*

(Continued)

*Primary Examiner* — Masud Ahmed
(74) *Attorney, Agent, or Firm* — Schwegman, Lunberg & Woessner, P.A.

(57) ABSTRACT

A system, computer-readable storage medium including instructions, and a computer-implemented method for obtaining votes for participants in a television program are described, in which code for a game is transmitted to a computer system, where the game includes an in-game voting module that allows a player of the game to cast votes for participants in a television program. At least one vote for at least one participant in the television program is received from the in-game voting module. A database including vote counts for the participants in the television program is updated based on the at least one vote for the at least one participant.

18 Claims, 19 Drawing Sheets

U.S. PATENT DOCUMENTS

| | | |
|---|---|---|
| 2007/0028272 A1* | 2/2007 | Lockton .................. 725/62 |
| 2007/0136776 A1 | 6/2007 | Findlay et al. |
| 2007/0192176 A1 | 8/2007 | Onischuk |
| 2007/0233585 A1* | 10/2007 | Ben Simon et al. ............ 705/35 |
| 2008/0098417 A1 | 4/2008 | Hatamian et al. |
| 2009/0083820 A1 | 3/2009 | Harrar et al. |
| 2009/0275010 A1 | 11/2009 | Findlay |
| 2010/0241493 A1 | 9/2010 | Onischuk |
| 2010/0273553 A1 | 10/2010 | Zalewski |
| 2011/0067044 A1* | 3/2011 | Albo .......................... 725/13 |

FOREIGN PATENT DOCUMENTS

| | | |
|---|---|---|
| CN | 101202890 A | 6/2008 |
| WO | WO-2010027985 A2 | 3/2010 |

OTHER PUBLICATIONS

U.S. Appl. No. 13/244,718, Non Final Office Action Mailed Jan. 18, 2012, 6 pgs.

* cited by examiner

| Player ID 602 | SN ID 604 | Email Address 606 | Name 608 | Age 610 | Sex 612 | Location 614 | Occupation 616 | ⋯ |

Figure 6

| Player ID 702 | Vote Allocation 704 | Vote Source 706 | Timestamp 708 | ⋯ |

Figure 7

| Program ID 802 | Program Name 804 | Description 806 | ⋯ |

Figure 8

| Player ID 902 | Program ID 904 | Timestamp 906 | ⋯ |

Figure 9

| Participant ID 1002 | Program ID 1004 | Name 1006 | Status 1008 | ⋯ |

Figure 10

| Episode ID 1102 | Program ID 1104 | Air Date 1106 | Air Time 1108 | Description 1110 | ⋯ |

Figure 11

| Vote ID 1202 | Episode ID 1204 | Description 1206 | Start Date 1208 | Start Time 1210 | End Date 1212 | End Time 1214 | Vote Type 1216 | ••• |

Figure 12

| Participant ID 1302 | Vote ID 1304 | Message 1306 | ••• |

Figure 13

| Vote ID 1402 | Player ID 1404 | Participant ID 1406 | Number of Votes 1408 | Timestamp 1410 | ••• |

Figure 14

| Game ID 1502 | Description 1504 | ••• |

Figure 15

| Task ID 1602 | Game ID 1604 | Description 1606 | Vote Allocation 1608 | Program Task ID 1610 | ••• |

Figure 16

| Task ID 1702 | Game ID 1704 | Player ID 1706 | Timestamp 1708 | ••• |

Figure 17

| Reward Code 1802 | Vote ID 1804 | Reward 1806 |
|---|---|---|

Figure 18

| Player ID 1902 | Game ID 1904 | Reward Code 1906 |
|---|---|---|

Figure 19

| Endorsement ID 2002 | Episode ID 2004 | Description 2006 | Reward 2008 |
|---|---|---|---|

Figure 20

| Endorsement ID 2102 | Participant ID 2104 | Number of Endorsements 2106 | Timestamp 2108 |
|---|---|---|---|

Figure 21

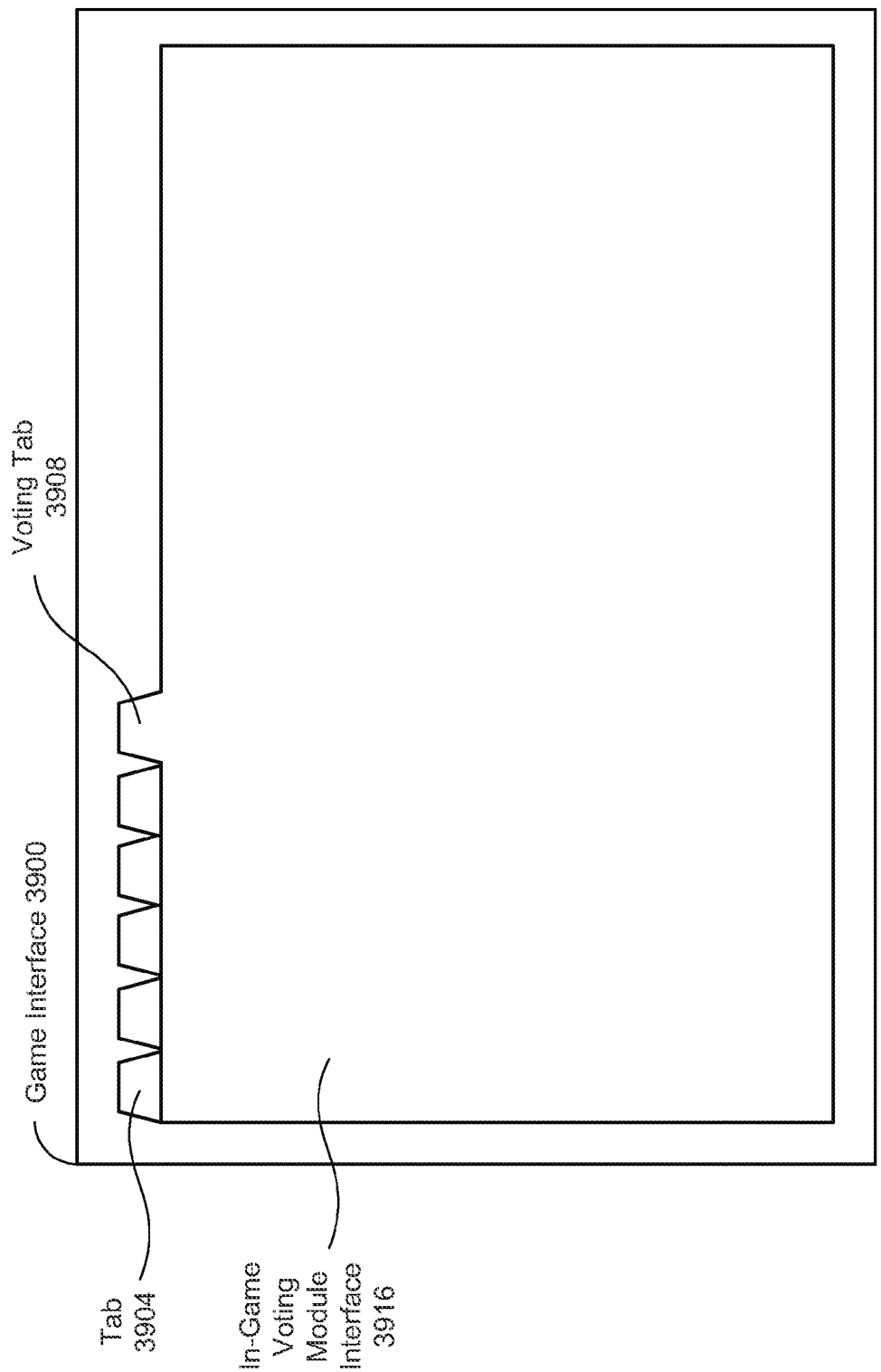

SYSTEM AND METHOD FOR USING A GAME TO INTERACT WITH TELEVISION PROGRAMS

CLAIM OF PRIORITY

This application is a continuation of U.S. patent application Ser. No. 13/070,757, entitled "SYSTEM AND METHOD FOR USING A GAME TO INTERACT WITH TELEVISION PROGRAMS," and filed Mar. 24, 2011, which is hereby incorporated herein by reference in its entirety.

TECHNICAL FIELD

The disclosed embodiments relate generally to a system and method for using a game to interact with television programs.

BACKGROUND

Television programs that include viewer participation typically allow viewers to vote for participants in a television program. These television programs allow viewers to vote either by dialing particular phone numbers and/or sending short messaging service (SMS) text messages to particular SMS short codes or phone numbers. The level of interactivity that the viewers have with the television program is limited.

BRIEF DESCRIPTION OF THE DRAWINGS

The embodiments disclosed in the present disclosure are illustrated by way of example, and not by way of limitation, in the figures of the accompanying drawings. Like reference numerals refer to corresponding parts throughout the drawings.

FIG. 6 is a block diagram illustrating an exemplary data structure for storing profile data for players of a game, according to some embodiments.

FIG. 7 is a block diagram illustrating an exemplary data structure for storing votes allocated to players of a game, according to some embodiments.

FIG. 8 is a block diagram illustrating an exemplary data structure for storing data for a television program, according to some embodiments.

FIG. 9 is a block diagram illustrating an exemplary data structure for storing a player subscription to a television program, according to some embodiments.

FIG. 10 is a block diagram illustrating an exemplary data structure for storing data for a participant of a television program, according to some embodiments.

FIG. 11 is a block diagram illustrating an exemplary data structure for storing data for an episode of a television program, according to some embodiments.

FIG. 12 is a block diagram illustrating an exemplary data structure for storing data for a voting session for an episode of a television program, according to some embodiments.

FIG. 13 is a block diagram illustrating an exemplary data structure for storing data for a participant of a television program that is associated with a voting session, according to some embodiments.

FIG. 14 is a block diagram illustrating an exemplary data structure for storing votes cast by a player of a game for a participant of a television program, according to some embodiments.

FIG. 15 is a block diagram illustrating an exemplary data structure for storing data for a game, according to some embodiments.

FIG. 16 is a block diagram illustrating an exemplary data structure for storing data for an in-game task, according to some embodiments.

FIG. 17 is a block diagram illustrating an exemplary data structure for storing data for an in-game task completed by a player of the game, according to some embodiments.

FIG. 18 is a block diagram illustrating an exemplary data structure for storing data for a reward for users that cast votes for a participant of a television program, according to some embodiments.

FIG. 19 is a block diagram illustrating an exemplary data structure for storing data for a player who has redeemed a reward code, according to some embodiments.

FIG. 20 is a block diagram illustrating an exemplary data structure for storing data for an endorsement task for a television program, according to some embodiments.

FIG. 21 is a block diagram illustrating an exemplary data structure for storing data for an endorsement for a participant of a television program, according to some embodiments.

FIG. 39B is a screenshot of an exemplary in-game voting module in the game interface, according to some embodiments.

DESCRIPTION OF EMBODIMENTS

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for using a game to interact with television (TV) programs.

Figure 1:
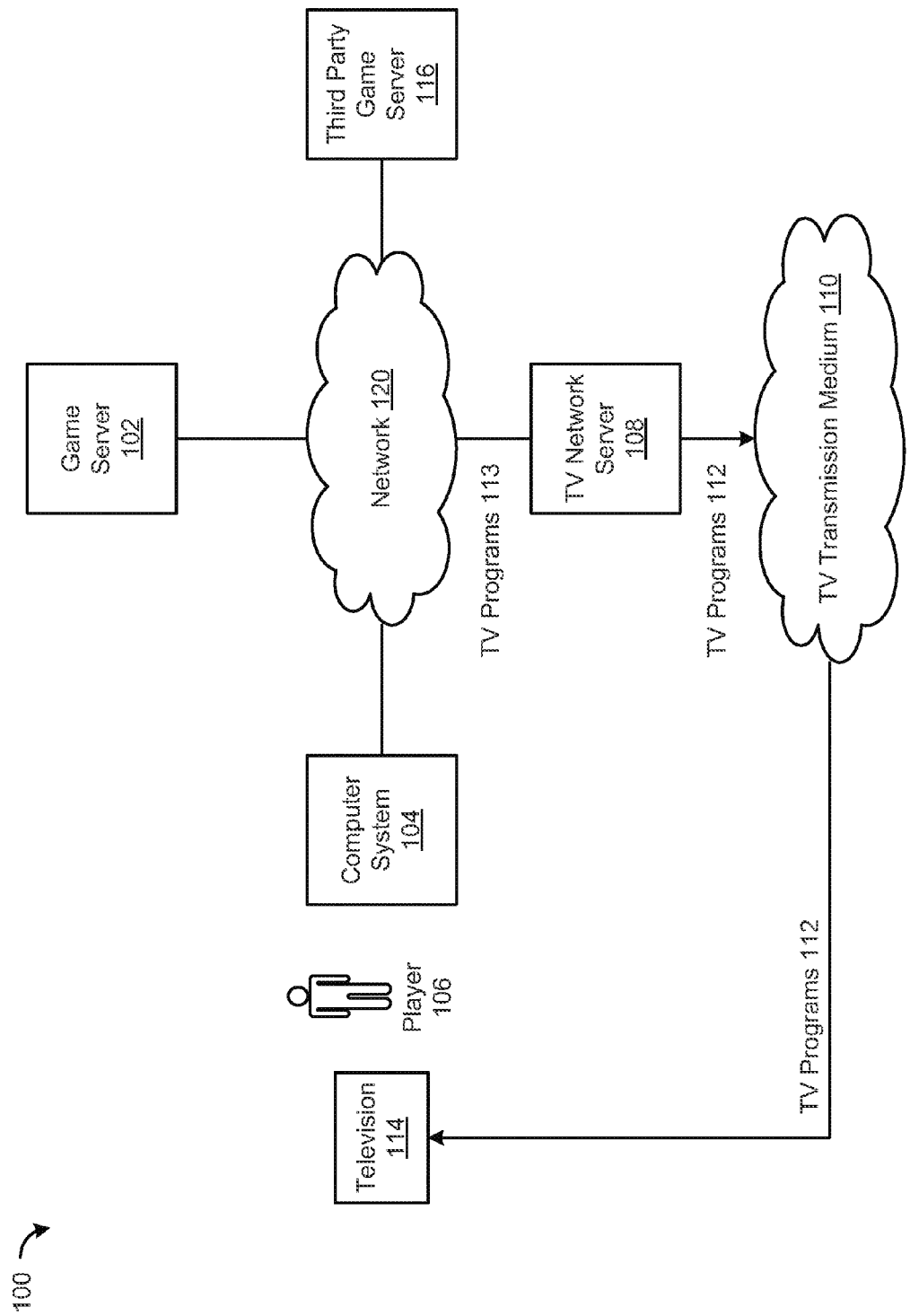
FIG. 1 is a block diagram illustrating a network system, according to some embodiments.

FIG. 1 is a block diagram illustrating a network system 100, according to some embodiments. The network system 100 includes a network 120. Network 120 can generally include any type of wired or wireless communication channel capable of coupling together computing nodes. This includes, but is not limited to, a local area network (LAN), a wide area network (WAN), or a combination of networks. In some embodiments, network 120 includes the Internet.

A computer system 104, a game server 102, a TV network server 108, and a third party game server 116 are coupled to network 120 and may communicate with each other via network 120.

The game server 102 may be a server for a game publisher. Similarly, the third party game server 116 may be a server for a third party game publisher. The network system 100 may include a game server for each of a plurality of game publishers. Similarly, the network system 100 may include a third party game server for each of a plurality of third party game publishers.

The TV network server 108 may provide TV programs 112 to a television 114 via TV transmission medium 110. The TV transmission medium 110 may include radio frequency (RF) signals (e.g., satellite signals, over-the-air signals, etc.), a data network, and a cable network. The TV network server 108 may also provide TV programs 113 to the computer system 104, the game server 102, and the third party game server 116 via network 120 (e.g., via a website associated with the TV network server 108).

The computer system 104 may include a laptop computer system, a desktop computer system, a mobile phone, a smart phone, a personal digital assistant (PDA), a gaming console, and a set top box. A player 106 may use the computer system 104 to play a game hosted by the game server 102 and/or the third party game server 116. In some embodiments, the game allows the player 106 to interact with TV programs via the TV network server 108. These embodiments are described in more detail below with respect to FIGS. 2-39.

Note that although FIG. 1 shows one instance for each of the computer system 104, the game server 102, the TV network server 108, and the third party game server 116, multiple computer systems, game servers, TV network servers, and third party game servers may be present in the network system 100. For example, each of the game server 102, the TV network server 108, and the third party game server 116 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.).

Also note that although the embodiments described herein refer to the computer system 104, the game server 102, the TV network server 108, and the third party game server 116, the embodiments may be applied to multiple computer systems, game servers, TV network servers, and third party game servers.

Figure 2A:
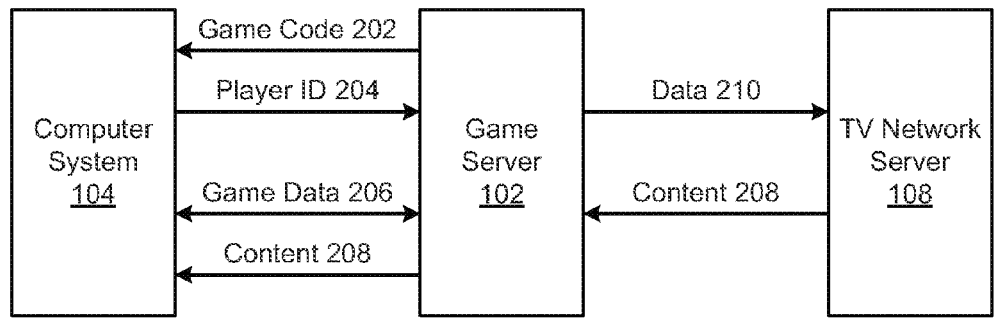
FIG. 2A is a block diagram illustrating data that is transferred between a game server, a computer system, and a television (TV) network server in the network system, according to some embodiments.

As discussed above, the game that is hosted on the game server 102 may be used to interact with TV programs via the TV network server 108. The interaction between the computer system 104, the game server 102, and the network server 108 is described with respect to FIG. 2A FIG. 2A is a block diagram illustrating data that is transferred between the game server 102, the computer system 104, and the TV network server 108 in the network system 100, according to some embodiments. In FIG. 2A, the player 106 uses the computer system 104 to send a request to the game server 102 indicating that the player 106 desires to play a game hosted by the game server 102. The request may include a player ID 204 that identifies the player 106. In response to receiving the request from the computer system 104, the game server 102 transmits game code 202 to the computer system 104. In some embodiments, the game code 202 includes an in-game voting module. The in-game voting module is described in more detail below. The computer system 104 then executes the game code 202.

While the player 106 plays the game, the computer system 104 and the game server 102 exchange game data 206. The game data 206 may include user interface elements for the game, a state of the game, game mechanics, messages being sent to other players of the game via chat, etc.), vote data, endorsement data, in-game task data, and in-game transactions (e.g., purchases of assets, interactions between players of the game, completion of tasks, etc.). Furthermore, the player 106 may use the in-game voting module to obtain content 208 from the TV network server 108 via the game server 102. The content 208 may include information about a TV program, information about an episode of a TV program, information about participants of a TV program (e.g., actors, contestants, etc., of a TV program), and/or multimedia content related to the TV program (e.g., text, images, video, and/or audio).

The game server 102 may send data 210 to the TV network server 108. The data 210 may include vote data, endorsement data, in-game task data, and demographic data for at least a subset of the players. The data 210 may be aggregated so that the vote data, the endorsement data, the in-game task data, and the demographic data are not associated with particular users. Alternatively, or additionally, the associations between the vote data, the endorsement data, the in-game task data, and the demographic data may be included in the data 210.

The data 210 may be sent to the TV network server 108 after a predetermined condition is satisfied. For example, the predetermined condition may be satisfied when the data 210 exceeds a predetermined size, a predetermined time interval has elapsed since the last time the data 210 was sent to the TV network server 108, a current date and/or time is greater than or equal to a predetermined date and/or time, and a request is received from the TV network server 108 to obtain the data 210.

Figure 2B:
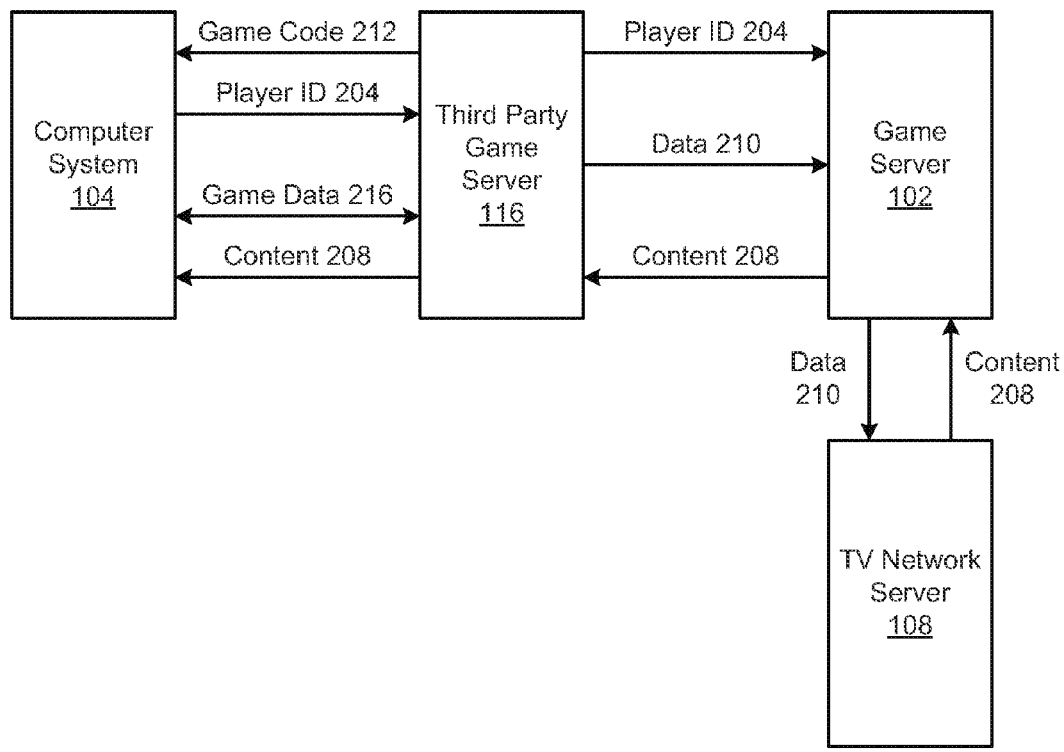
FIG. 2B is a block diagram illustrating data that is transferred between a game server, a third party game server, a computer system, and a TV network server in the network system, according to some embodiments.

FIG. 2B is a block diagram illustrating data that is transferred between the game server 102, the third party game server 116, the computer system 104, and the TV network server 108 in the network system 100, according to some embodiments. FIG. 2A and FIG. 2B include similar elements. However, instead of interacting directly with the game server 102, the computer system 104 interacts with the third party game server 116, which in turn interacts with the game server 102. For example, in FIG. 2B, the player 106 uses the computer system 104 to send a request to the third party game server 116 indicating that the player 106 desires to play a game hosted by the third party game server 116. Again, the request may include a player ID 204 that identifies the player 106. In response to receiving the request from the computer system 104, the third party game server 116 transmits game code 212 to the computer system 104. In some embodiments, the game code 212 includes an in-game voting module. In some embodiments, the in-game voting module is provided by the game server 102 to the third party game server 116 for inclusion with the game code 212. In some embodiments, the in-game voting module is provided by the third party game server 116. In these embodiments, the in-game voting module may include calls to an application programming interface (API) for interacting with TV programs provided by the game server 102. The computer system 104 then executes the game code 212.

While the player 106 plays the game, the computer system 104 and the third party game server 102 exchange game data 216. The game data 216 is similar to the game data 206 described above. The player 106 may use the in-game voting module to obtain content 208 from the TV network server 108 via the third party game server 116, which obtains the content via the game server 102. The third party game server 116 may send data 210 to the TV network server 108 via the game server 102.

Figure 3:
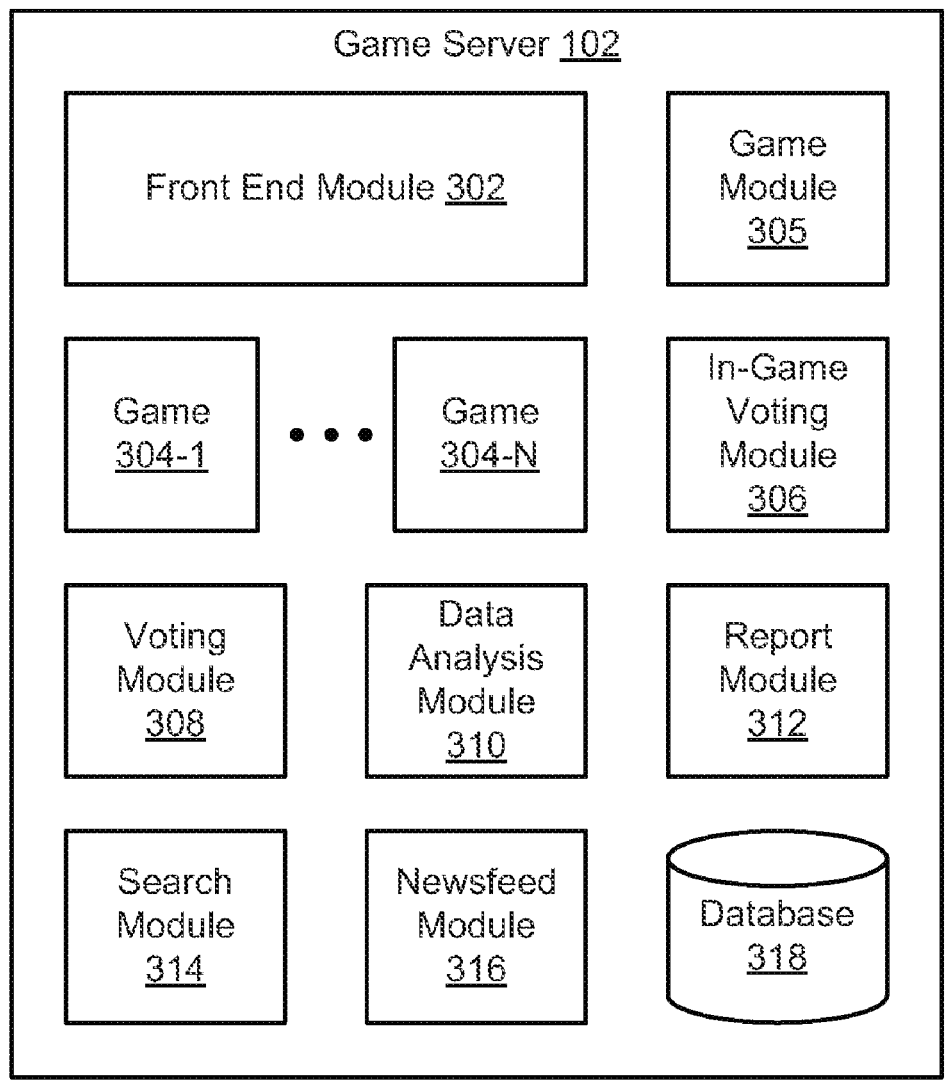
FIG. 3 is a block diagram illustrating a game server, according to some embodiments.

FIG. 3 is a block diagram illustrating the game server 102, according to some embodiments. The game server 102 includes a front end module 302, a game module 303, games 304, an in-game voting module 306, a voting module 308, a data analysis module 310, a report module 312, a search module 314, a newsfeed module 316, and a database 318. The front end module 302 transmits data and/or commands to and receives data and/or commands from the computer system 104 and the TV network server 108. Games 304 include server-side code for games 304 and client-side code for games 304 (e.g., the game code 202, the game code 212). The games 304 may include network-based social games (e.g., games played on a social networking website, multiplayer games, etc.). The game module 305 transmits client-side game code for games 304 to the computer system 104 and executes server-side game code for games 304. The in-game voting module 306 facilitates interaction between players of a game and TV programs. In some embodiments, the in-game voting module 306 is included with the client-side game code (e.g., the game code 202, the game code 212). The voting module 308 allocates votes to players of a game, receives votes from players of a game, and validates vote data, endorsement data, and/or in-game task data received from the in-game voting module 306 executing on the client computer system 104. The in-game voting module 306 and the voting module 308 are described in more detail with respect to FIGS. 22-39. The data analysis module 310 analyzes the vote data, the endorsement data, and the in-game task data to identify trends in the data. The data analysis module 310 may also correlate the vote data, the endorsement data, and/or the in-game task data with demographic data for the players. The report module 312 generates reports based on the raw and/or analyzed vote data, endorsement data, and in-game task data. The search module 314 performs searches based on search queries submitted by players of games. The newsfeed module 316 generates newsfeeds for players based on the TV programs to which the players have subscribed and/or TV programs to which friends of the players have subscribed. The database 318 may store the raw and/or analyzed vote data, the raw and/or analyzed endorsement data, the raw and/or analyzed in-game task data, reports, search queries, search results, newsfeeds, and/or content received from the TV network server 108.

Figure 4:
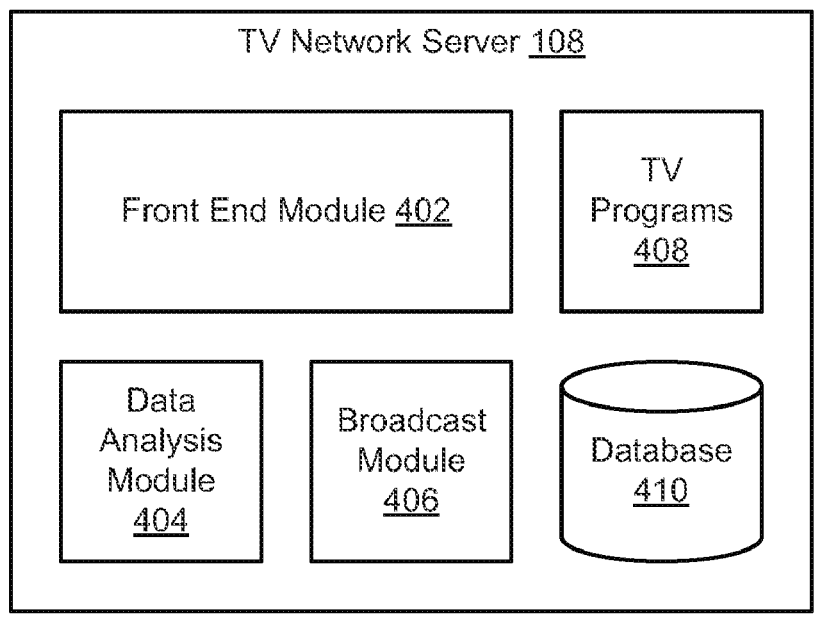
FIG. 4 is a block diagram illustrating a TV network server, according to some embodiments.

FIG. 4 is a block diagram illustrating the TV network server 108, according to some embodiments. The TV network server 108 includes a front end module 402, TV programs 408, a data analysis module 404, a broadcast module 406, and a database 410. The front end module 402 transmits data and/or commands to and receives data and/or commands from the computer system 104 and/or the game server 102. For example, the front end module 402 may receive vote data, endorsement data, and in-game task data from the voting module 308 of the game server 102. The data analysis module 404 analyzes vote data, endorsement data, and in-game task data to identify trends in the data. The data analysis module 404 may also correlate the vote data, the endorsement data, and/or the in-game task data with demographic data for the players. The broadcast module 406 transmits the TV programs 408 via the TV transmission medium 110. The database 410 stores raw and/or analyzed vote data, the raw and/or analyzed endorsement data, the raw and/or analyzed in-game task data, reports, and/or content associated with the TV programs 408.

Figure 5:
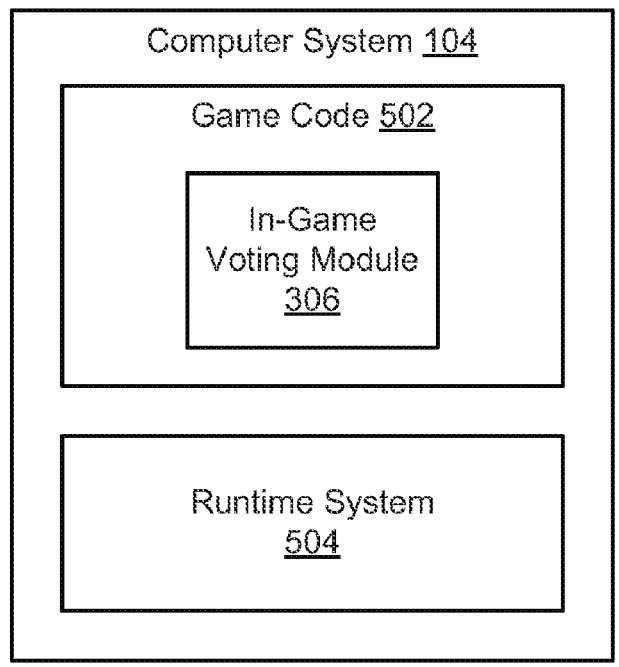
FIG. 5 is a block diagram illustrating a computer system, according to some embodiments.

FIG. 5 is a block diagram illustrating the computer system 104, according to some embodiments. The computer system 104 includes game code 502 and a runtime system 504. The game code 502 (e.g., the client-side game code) is received from the game server 102 or the third party game server 116. In some embodiments, the game code 502 includes the in-game voting module 306. The runtime system 504 (e.g., Java runtime system, Flash runtime system, etc.) executes the game code 502 to generate a user interface for the player 106 to play the game 204 and executes the in-game voting module 306.

Data Structures

FIG. 6 is a block diagram illustrating an exemplary data structure for storing profile data for players of a game, according to some embodiments. In some embodiments, the data structure for storing the profile data for players is stored in the database 318 of the game server 102. The data structure for storing profile data for players of a game includes a player ID field 602 to store an identifier of a player of a game, a social network ID field 604 to store a user identifier, a social network for the player, an email address field 606 to store an email address of the player, a name field 608 to store a name (e.g., a screen name, a pseudonym, a real name) of the player, an age field 610 to store an age or age range of the player, a sex field 612 to store the sex of the player, a location field 614 to store the location (e.g., an address, a geographic region, GPS coordinates) of the player, and an occupation field 616 to store the occupation of the player. Note that demographic data for the player maybe stored in the data structure. Also note that demographic data may be obtained from a social network to which the player belongs.

FIG. 7 is a block diagram illustrating an exemplary data structure for storing votes allocated to players of a game, according to some embodiments. In some embodiments, the data structure for storing votes allocated to players of a game is stored in the database 318 of the game server 102. The data structure for storing votes allocated to players of a game includes a player ID field 702 to store an identifier of a player of a game, a vote allocation field 704 to store the number of votes allocated to the player of the game from a vote source, a vote source field 706 to store a source of the votes allocated to the player of the game (e.g., votes allocated by a TV program to the player, votes allocated by a game to the player for completing in-game tasks, votes allocated to the player as a reward, votes allocated to the player for winning a contest, votes purchased by the player, votes donated to a player from friends of the player), and a timestamp field 708 to store a date and/or time that the votes were allocated to the player of the game.

FIG. 8 is a block diagram illustrating an exemplary data structure for storing data for a TV program, according to some embodiments. In some embodiments, the data structure for storing data for a TV program is stored in the database 318 of the game server 102. The data structure for storing data for a TV program includes a program ID field 802 to store an identifier for a TV program, a program name field 804 to store a name of the TV program, and a description field 806 to store a description of the TV program.

FIG. 9 is a block diagram illustrating an exemplary data structure for storing a player subscription to a TV program, according to some embodiments. In some embodiments, the data structure for storing a player subscription to a TV program is stored in the database 318 of the game server 102. The data structure for storing a player subscription to a TV program includes a player ID field 902 to store an identifier for a player of a game, a program identifier field 904 to store an identifier for a TV program to which the player is subscribed, and a timestamp field 906 to store a date and/or time that the player subscribed to the TV program.

FIG. 10 is a block diagram illustrating an exemplary data structure for storing data for a participant of a TV program, according to some embodiments. A participant of a TV program may be an actor in the TV program, a contestant in a TV competition program (e.g., a reality TV program), and the like. In some embodiments, the data structure for storing data for a participant of a TV program is stored in the database 318 of the game server 102. The data structure for storing data for a participant of a TV program includes a participant ID field 1002 to store an identifier for a participant of a TV program, a program ID field 1004 to store an identifier of the TV program, a name field 1006 to store a name of the participant of the TV program, and a status field 1008 to store a status of the participant of the TV program (e.g., whether the participant is an active participant or has been eliminated)

FIG. 11 is a block diagram illustrating an exemplary data structure for storing data for an episode of a television program, according to some embodiments. In some embodiments, the data structure for storing data for an episode of a television program is stored in the database 318 of the game server 102. The data structure for storing data for an episode of a television program includes an episode ID field 1102 to store an identifier for an episode of the TV program, a program ID field 1104 to store an identifier for the TV program associated with the episode, an air date field 1106 to store a date when the episode airs (or aired), an air time field 1108 to store a time when the episode airs (or aired), and a description field 1110 to store a description of the episode.

FIG. 12 is a block diagram illustrating an exemplary data structure for storing data for a voting session for an episode of a TV program, according to some embodiments. In some embodiments, the data structure for storing data for a voting session for an episode of a TV program is stored in the database 318 of the game server 102. The data structure for storing data for a voting session for an episode of a TV program includes a vote ID field 1202 to store an identifier for a voting session, an episode ID field 1204 to store an identifier for an episode of the TV program, a description field 1206 to store a description of the voting session, a start date field 1208 to store a start date of the voting session, a start time field 1210 to store a start time of the voting session, an end date field 1212 to store an end date of the voting session, an end time field 1214 to store and end time of the voting session, and an optional vote type field 1216 to store a type of the voting session. The type of the voting session may include a voting session in which each player can vote once, a voting session in which each player is allocated a predetermined number of votes to cast for at least one participant of the TV program, a voting session in which each player is allocated votes based on the in-game tasks that the player has performed, and a voting session in which each player is allocated votes based on the voting history of the player (e.g., the player may be allocated more votes when the player's voting record indicates that the player has chosen winners of prior voting sessions, etc.).

FIG. 13 is a block diagram illustrating an exemplary data structure for storing data for a participant of a TV program that is associated with a voting session, according to some embodiments. Note that not all participants of a TV program may participate in every voting session for the TV program. For example, participants may have immunity from a voting session, participants may have already been voted off from the TV program, and so forth. In some embodiments, the data structure for storing data for a participant of a TV program that is associated with a voting session is stored in the database 318 of the game server 102. The data structure for storing data for a participant of a TV program that is associated with a voting session includes a participant ID field 1302 to store an identifier for a participant of the TV program that is associated with a voting session, a vote ID field 1304 to store a voting session identifier to which the participant of the TV program is associated, and a message field 1306 to store a message from the participant with respect to the voting session (e.g., "Please vote for me").

FIG. 14 is a block diagram illustrating an exemplary data structure for storing votes cast by a player of a game for a participant of a TV program, according to some embodiments. In some embodiments, the data structure for storing votes cast by a player of a game for a participant of a TV program is stored in the database 318 of the game server 102. The data structure for storing votes cast by a player of a game for a participant of a TV program includes a vote ID field 1402 to store an identifier for a voting session, a player ID field 1404 to store an identifier for a player, a participant ID field 1406 to store an identifier for a participant of the TV program for which the player cast votes, a number of votes field 1408 to store a number of votes that the player cast for the participant of the TV program, and a timestamp field 1410 to store a date and/or time at which the participant cast the votes for the participant of the TV show.

FIG. 15 is a block diagram illustrating an exemplary data structure for storing data for a game, according to some embodiments some embodiments, the data structure for storing data for a game is stored in the database 318 of the game server 102. The data structure for storing data for a game includes a game ID field 1502 to store an identifier for a game and a description field 1504 to store a description of the game.

FIG. 16 is a block diagram illustrating an exemplary data structure for storing data for an in-game task, according to some embodiments. In some embodiments, the data structure for storing data for an in-game task is stored in the database 318 of the game server 102. The data structure for storing data for an in-game task includes a task ID field 1602 to store an identifier for an in-game task, a game ID field 1604 to store an identifier for a game, a description field 1606 to store a description of the in-game task, an optional vote allocation field 1608 to store a number of votes to be allocated to players of the game that complete the in-game task, and an optional program task ID field 1610 to store an identifier for a corresponding TV program task to be performed by participants of a TV program.

FIG. 17 is a block diagram illustrating an exemplary data structure for storing data for an in-game task completed by a player of the game, according to some embodiments. In some embodiments, the data structure for storing data for an in-game task completed by a player of the game is stored in the database 318 of the game server 102. The data structure for storing data for an in-game task completed by a player of the game includes a task ID field 1702 to store a task identifier for an in-game task completed by a player of a game, a game ID field 1704 to store an identifier for the game, a player ID field 1706 to store an identifier of the player, and a timestamp field 1708 to store a date and/or time that the player completed the in-game task.

FIG. 18 is a block diagram illustrating an exemplary data structure for storing data for a reward for users that cast votes for a participant of a TV program, according to some embodiments. In some embodiments, the data structure for storing data for a reward for users that cast votes for a participant of a TV program is stored in the database 318 of the game server 102. The data structure for storing data for a reward for users that cast votes for a participant of a TV program includes a reward code field 1802 to store an identifier for a reward to be given to a player of a game for casting votes for a participant of a TV program, a vote ID field 1804 to store an identifier for a voting session associated with the reward, and a reward field 1806 to store information about a reward to be given to the player of the game for casting votes for the participant of the TV program.

FIG. 19 is a block diagram illustrating an exemplary data structure for storing data for a player who has redeemed a reward code, according to some embodiments. In some embodiments, the data structure for storing data for a player that has redeemed a reward code is stored in the database 318 of the game server 102. The data structure for storing data for a player that has redeemed a reward code includes a player ID field 1902 to store an identifier of a player that has redeemed a reward code, a game ID field 1904 to store an identifier for the game, and a reward code 1906 to store the reward code redeemed by the player.

FIG. 20 is a block diagram illustrating an exemplary data structure for storing data for an endorsement task for a TV program, according to some embodiments, in some embodiments, the data structure for storing data for an endorsement task for a TV program is stored in the database 318 of the game server 102. The data structure for storing data for an endorsement task for a TV program includes an endorsement ID field 2002 to store an identifier for an endorsement task for a TV program, an episode ID field 2004 to store an identifier for an episode of the TV program to which the endorsement task is associated, a description field 2006 to store a description of the endorsement task, and a reward field 2008 to store information about a reward to be given to a participant of the TV program when the endorsement task is satisfied.

FIG. 21 is a block diagram illustrating an exemplary data structure for storing data for an endorsement for a participant of a television program, according to some embodiments. In some embodiments, the data structure for storing data for an endorsement for a participant of a television program is stored in the database 318 of the game server 102. The data structure for storing data for an endorsement for a participant of a television program includes an endorsement ID field 2102 to store an identifier for an endorsement task for a participant of a TV program, a participant ID field 2104 to store an identifier for the participant of the TV program, a number of endorsements field 2106 to store a number of endorsements received by the participant, and a timestamp field 2108 to store a date and/or time when the number of endorsements was recorded.

Interacting with TV Programs

As discussed above, the level of interactivity that the viewers of TV programs have with the television program is limited. For example, for TV competition programs, viewers are given the opportunity to vote for participants (e.g., contestants) in the TV competition program. Viewers may cast their votes by using a phone to dial a particular phone number, using a mobile phone to send a SMS message to a particular SMS short code or to a particular phone number, or using a website associated with the TV competition program. These techniques for viewer participation provide a basic level of interactivity. The embodiments described herein provide viewers of TV programs with an enhanced level of interactivity.

In some embodiments, games are used to enhance the level of interactivity that viewers of TV programs have with the TV programs. These online games may include network-based social games (e.g., games played with friends on a social networking website), multiplayer real-time strategy games, multiplayer role playing games, and the like.

Figure 22:
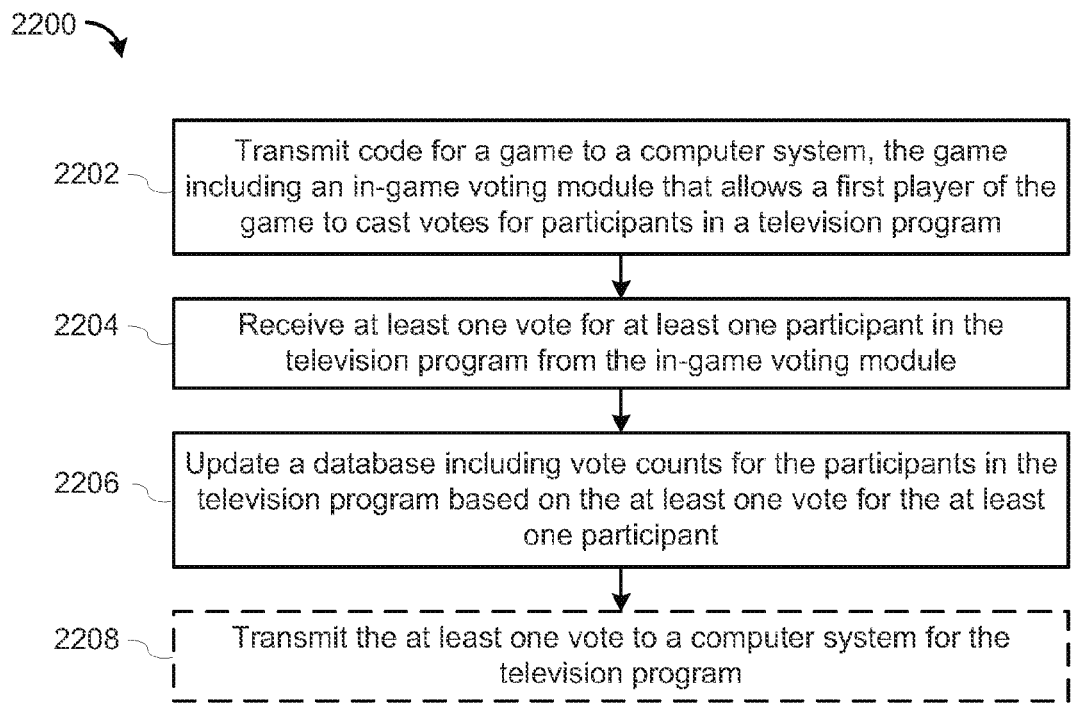
FIG. 22 is a flowchart of a method for obtaining votes for participants in a television program from players of a game, according to some embodiments.

In some embodiments, players of a game cast votes for participants of a TV program from within the game. FIG. 22 is a flowchart of a method 2200 for obtaining votes for participants in a TV program from players of a game, according to some embodiments. The game module 305 transmits (2202) code for a game (e.g., the game code 202, the game code 212) to the computer system 104. In some embodiments, the game (e.g., the game code 202, the game code 212) includes the in-game voting module 306 that allows a player of the game to cast votes for participants in a TV program. In some embodiments, the game is a network-based social game. In some embodiments, the TV program is a TV competition program and the participants are contestants in the TV competition program.

In some embodiments, the in-game voting module 306 is accessible to the player via a game element in the game.

Figure 39A:
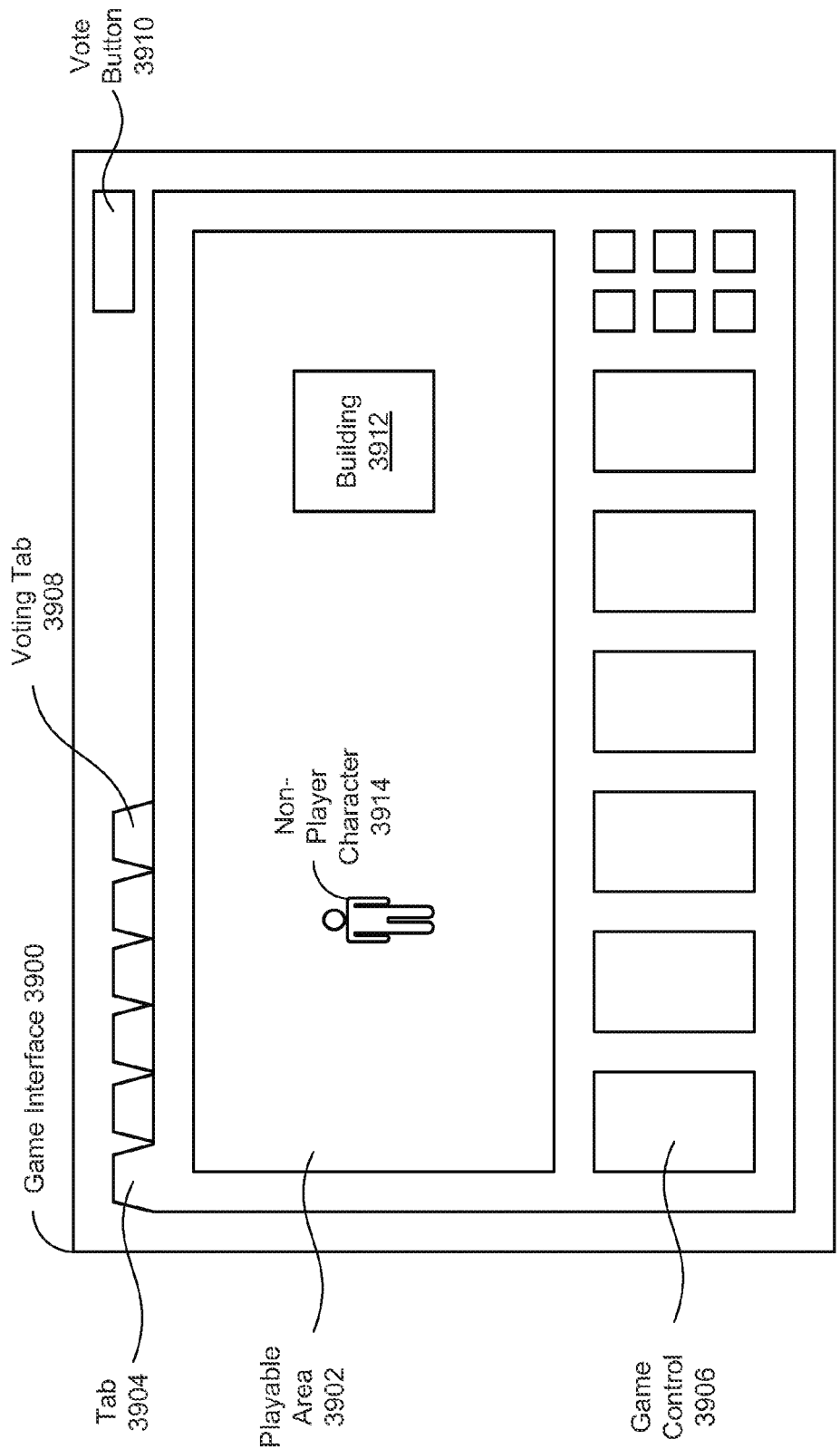
FIG. 39A is a screenshot of an exemplary game interface, according to some embodiments.

Attention is now directed to FIG. 39A, which is screenshot an exemplary game interface 3900, according to some embodiments. The game interface 3900 includes a playable area 3902 that includes at least one game element. The playable area 3902 is an area of the game interface 3900 in which the player of the game interacts with game elements of the game buildings, non-player characters, other human players, crops, etc.). For example, the player of the game may place buildings, crops, and/or other objects in the playable area 3902. Similarly, the player of the game may interact with non-player characters and/or other human players in the playable area 3902. As illustrated in FIG. 39A, the playable area 3902 includes a building 3912 and a non-player character 3914. The game interface 3900 may include other types of game elements. For example, the game interface 3900 may include a building in a playable area for a non-player character that the player of the game may access via the playable area 3902. The playable area for a non-player character may include a city for the non-player character, an inside of a building for the non-player character, a farm for the non-player character, and the like. The game interface 3900 may also include game controls (e.g., game control 3906) that allow the player to issue commands used to play the game. For example, the game controls may include game controls to purchase game elements, to place game elements, to visit playable areas of friends or non-player characters, and the like. The game interface 3900 may also include user interface elements that allow the player to modify the presentation of the game interface 3900. For example, the game interface 3900 may include tabs (e.g., a tab 3904, a voting tab 3908, etc.), buttons (e.g., a vote button 3910), and the like. Note that the game elements, the user interface elements, and the game controls illustrated in FIG. 39A are exemplary and that other game elements, user interface elements, and game controls may be present in the playable area 3902.

In some embodiments, the in-game voting module 306 is accessible to the player via a game element in the game. For example, the player may use the building 3912, the non-player character 3914, or a building in a playable area for a non-player character to access the in-game voting module 306.

In some embodiments, the in-game voting module 306 is accessible to the player via a user interface element in the game. For example, the player may use the voting tab 3908, a window in the game interface 3900, or the vote button 3910 to access the in-game voting module 306.

Figure 39C:
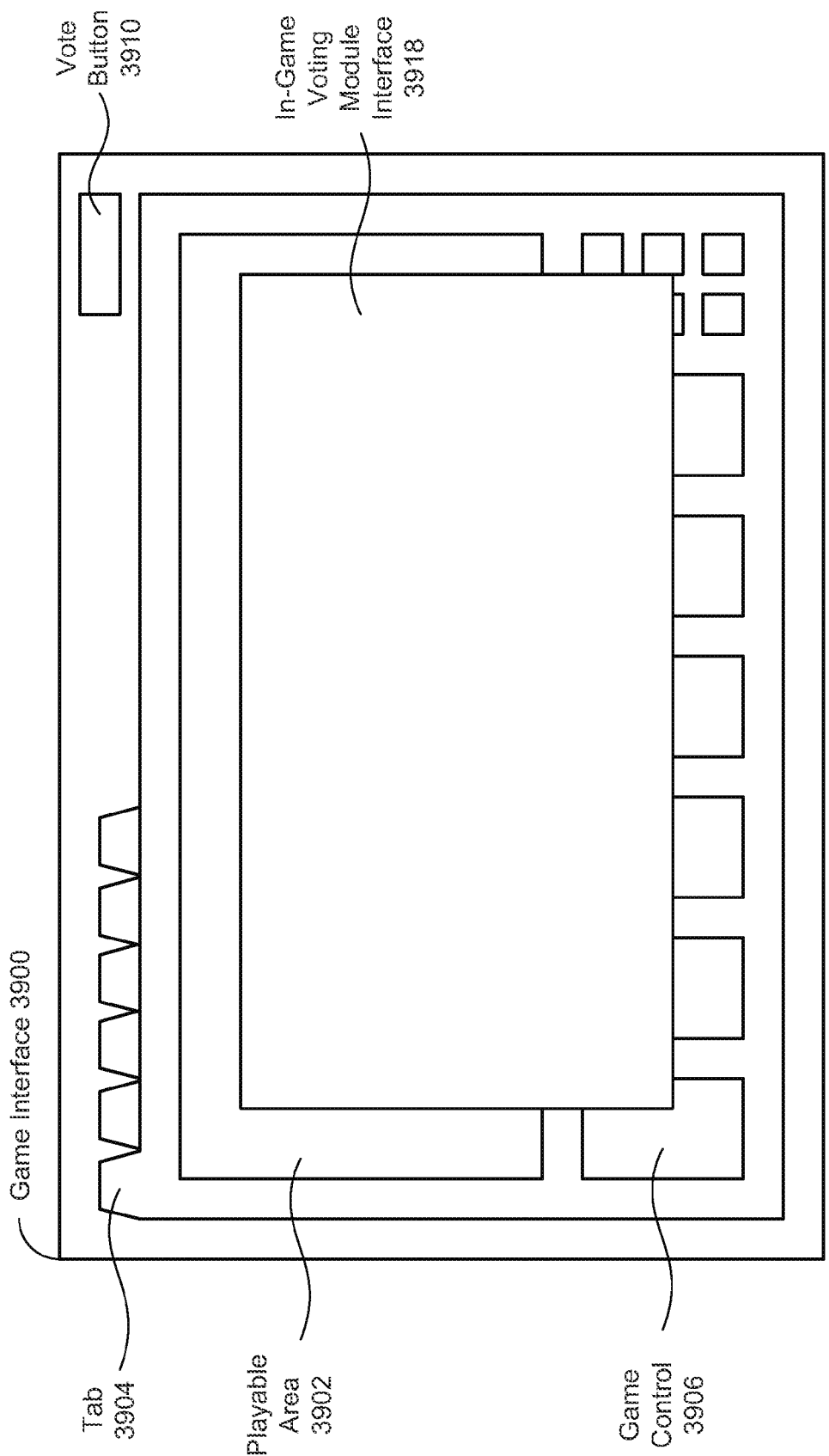
FIG. 39C is a screenshot of another exemplary in-game voting module in the game interface, according to some embodiments.
Figure 39D:
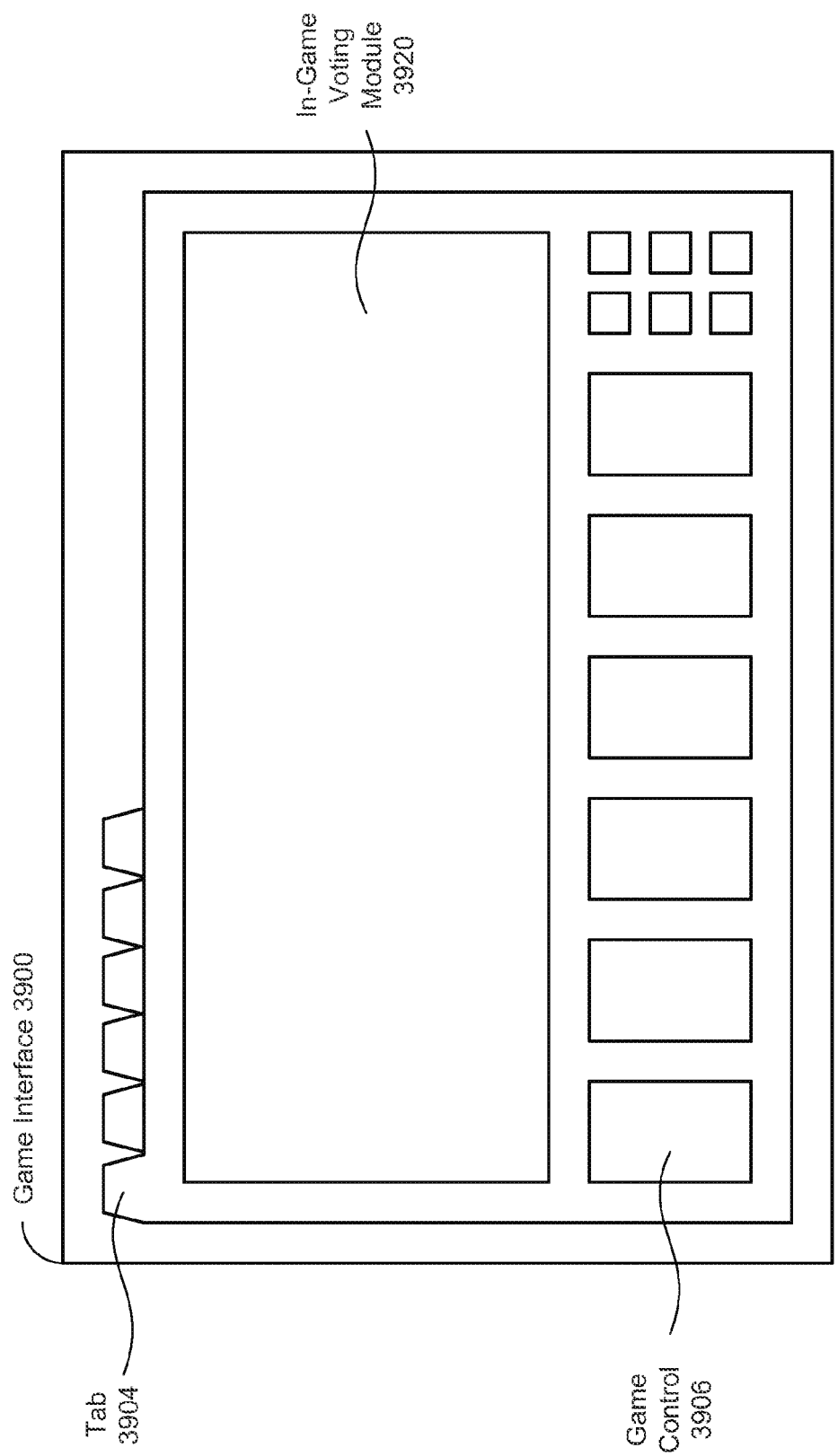
FIG. 39D is a screenshot of another exemplary in-game voting module in the game interface, according to some embodiments.

FIGS. 39B, 39C, and 39D are screenshots of exemplary in-game voting module interfaces in the game interface 3900, according to some embodiments. If the player uses the voting tab 3908 to access the in-game voting module 306, an in-game voting module interface 3916 is presented in the voting tab 3908. If the player user the vote button 3910 or a game element in the playable area 3902 to access the in-game voting module 306, an in-game voting module interface 3918 is superimposed over existing game elements, user interface elements, and/or game controls displayed in the game interface 3900 (e.g., as a pop-up window, etc.). If the player uses a non-player character, a building in a playable area of the non-player character, or visits a playable area for a non-player character to access the playable area 3902, an in-game voting module interface 3920 is presented in an area that was used to display the playable area 3902.

Returning to FIG. 22, the voting module 308 receives (2204) at least one vote for at least one participant in the TV program from the in-game voting module 306. In some embodiments, the at least one vote for the at least one participant includes a vote cast by the player for a participant. For example, the player of the game may use the in-game voting module 306 to cast a vote for a participant in the TV program. In some embodiments, the at least one vote for the at least one participant includes a plurality of votes for a participant cast by the player. For example, the player of the game may use the in-game voting module 306 to cast multiple votes for one participant in the TV program. In some embodiments, the at least one vote for the at least one participant includes a plurality of votes for a plurality of participants cast by the player. For example, the player of the game may use the in-game voting module 306 to cast multiple votes for multiple participants in the TV program.

In some embodiments, the player of the game casts the at least one vote for the at least one participant in response to a request by a second player of the game to vote for the at least one participant. For example, the second player may be a friend of the player and second player may have asked the player to cast votes for a particular participant of the TV program.

In some embodiments, the at least one vote for the at least one participant includes one or more of a vote for the at least one participant and a vote against the at least one participant. For example, some TV competition programs select participants to stay in the competition based on the number of votes for the participants that are received from viewers. Alternatively, some TV competition programs select participants to leave the competition based on the number of votes against the participants that are received from viewers.

Figure 23:
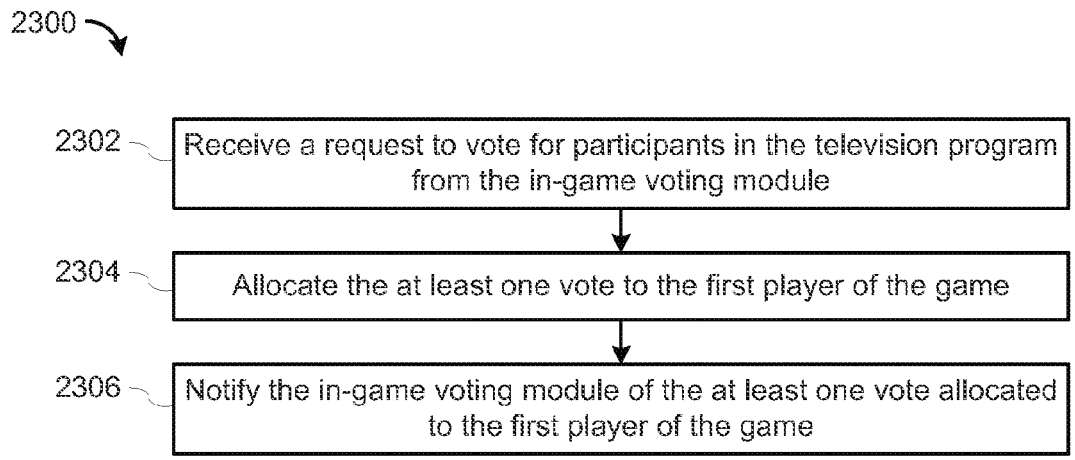
FIG. 23 is a flowchart of a method for allocating votes to a player of a game, according to some embodiments.

In some embodiments, prior to receiving (2204) the at least one vote for the at least one participant, the voting module 308 allocates votes to a player of the game. Attention is now directed to FIG. 23, which is a flowchart of a method 2300 for allocating votes to a player of a game, according to some embodiments. The voting module 308 receives (2302) a request to vote for participants in the television program from the in-game voting module 306.

The voting module 308 allocates (2304) the at least one vote to the player of the game. For example, the voting module 308 may create an entry in the data structure for storing votes allocated to players of a game illustrated in and described with respect to FIG. 7. FIGS. 24-27 illustrate several methods for allocating (2304) the at least one vote to the player of the game, according to some embodiments.

Figure 24:
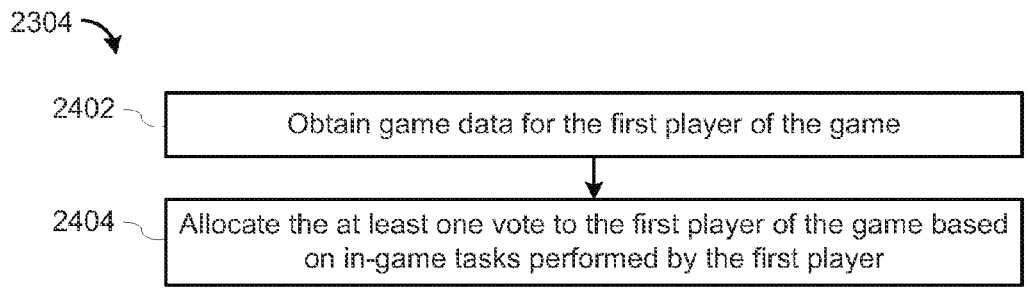
FIG. 24 is a flowchart of a method for allocating votes to a player of a game, according to some embodiments.

Referring to FIG. 24, the voting module 308 obtains (2402) game data for the player of the game. The voting module 308 then allocates (2404) the at least one vote to the player of the game based on in-game tasks performed by the player, wherein the performed in-game tasks are determined from the game data (e.g., the game data 206, the game data 216). For example, the voting module 308 may allocate votes based on the number and types of in-game tasks performed by the player.

Figure 25:
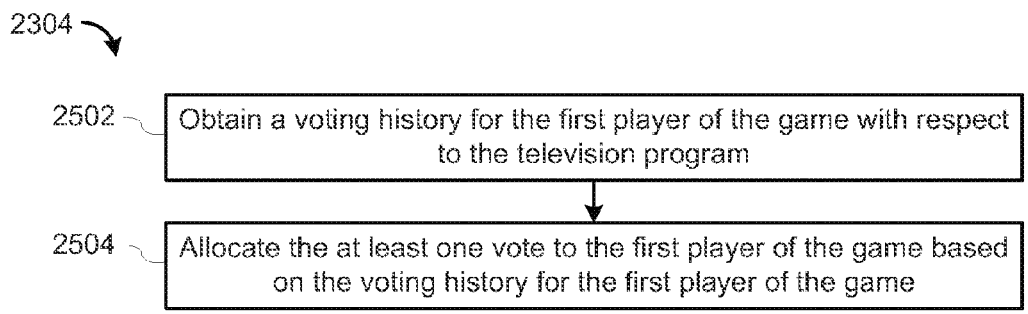
FIG. 25 is a flowchart of another method for allocating votes to a player of a game, according to some embodiments.

Referring to FIG. 25, the voting module 308 obtains (2502) a voting history for the player of the game with respect to the television program. The voting module 308 then allocates (2504) the at least one vote to the player of the game based on the voting history for the player of the game. For example, the voting module 308 may allocate a first predetermined number of votes to the player if the player voted for a participant that received the highest number of votes in a prior voting session. Similarly, the voting module 308 may allocate a second predetermined number of votes to the player if the player voted for a participant that did not receive the highest number of votes in a prior voting session, where the second predetermined number of votes is less than the first predetermined number of votes.

Figure 26:
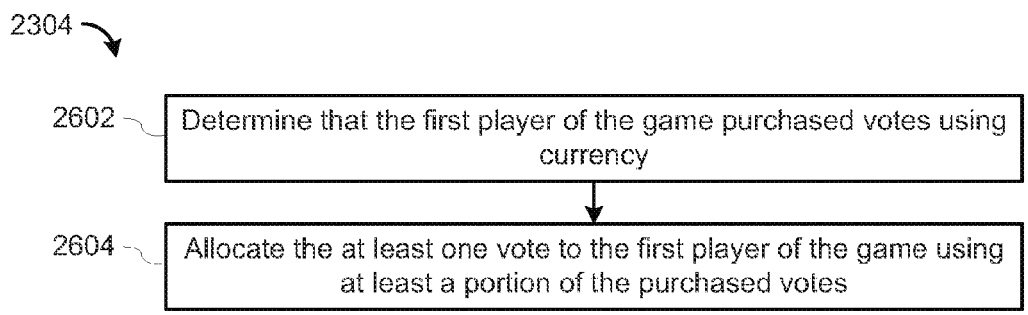
FIG. 26 is a flowchart, of another method for allocating votes to a player of a game, according to some embodiments.

Referring to FIG. 26, the voting module 308 determines (2602) that the player of the game purchased votes using currency. In some embodiments, the currency is real-world currency (e.g., dollars). In some embodiments, the currency is in-game currency (e.g., proprietary currency, credits, electronic or virtual cash). The voting module 308 then allocates (2604) the at least one vote to the player of the game using at least a portion of the purchased votes. For example, if a single vote can be purchased for $1 and the player paid $10 for votes, the voting module 308 allocates 10 votes to the player.

Figure 27:
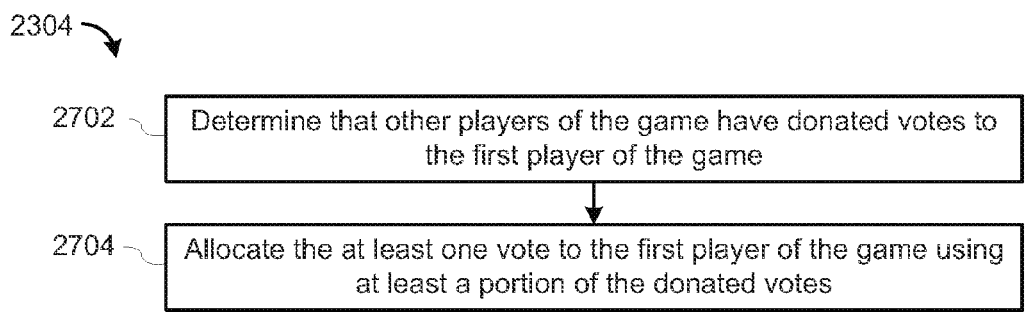
FIG. 27 is a flowchart of another method for allocating votes to a player of a game, according to some embodiments.

Referring to FIG. 27, the voting module 308 determines (2702) that other players of the game have donated votes to the player of the game. The voting module 308 then allocates the at least one vote to the player of the game using at least a portion of the donated votes. For example, a friend of the player may donate 10 votes to the player. Accordingly, the voting module 308 allocates the 10 votes to the player.

Returning to FIG. 23, the voting module 308 notifies (2306) the in-game voting module 306 of the at least one vote allocated to the player of the game. The in-game voting module 306 may determine a type of voting session for which the player desires to cast votes, based on the determination, the in-game voting module 306 may allow the player to cast a number of votes up to the number of votes allocated to the player.

Returning to FIG. 22, the voting module 308 updates (2206) a database (e.g., the database 318) including vote counts for the participants in the TV program based on the at least one vote for the at least one participant. For example, if the player of the game voted for a participant of the TV program, the voting module 308 updates the database 318 to reflect the fact that the player of the game voted for the participant of the TV program. The voting module 308 may store the votes cast by the player in the data structure for storing votes illustrated in and described with respect to FIG. 14.

Figure 28:
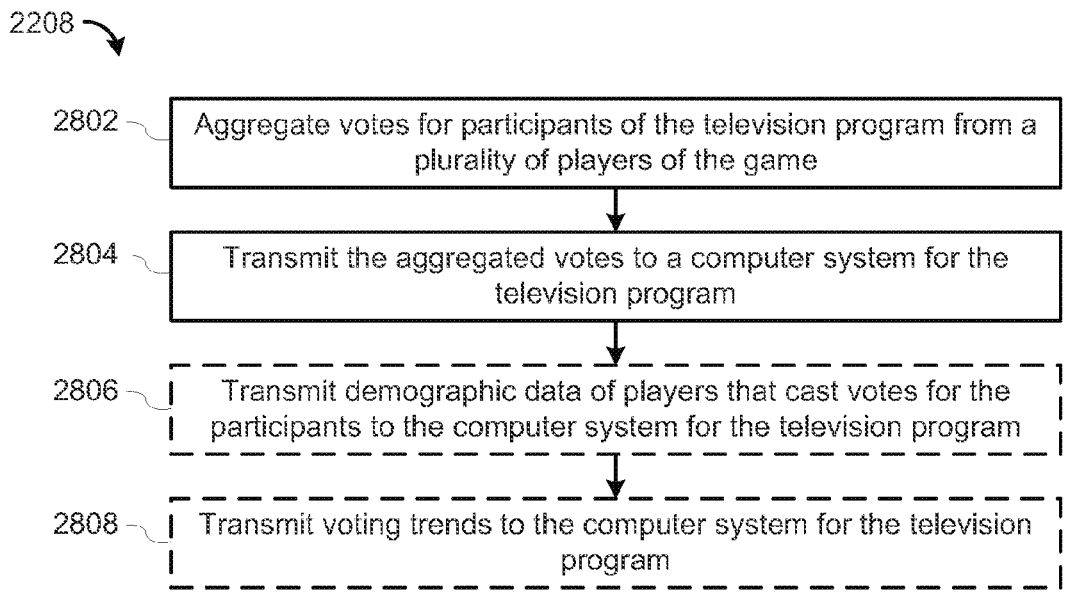
FIG. 28 is a flowchart of a method for providing votes to a computer system for a television program, according to some embodiments.

In some embodiments, the voting module 308 transmits (2208) the at least one vote to a computer system for the television program (e.g., the TV network server 108). Attention is now directed to FIG. 28, which is a flowchart of a method for providing votes to a computer system for a television program, according to some embodiments. The voting module 308 aggregates (2802) votes for participants of the television program from a plurality of players of the game and transmits (2804) the aggregated votes to a computer system for the television program (e.g., the TV network server 108).

The voting module 308 may provide additional data to the computer system for the television program. In some embodiments, the voting module 308 transmits (2806) demographic data of players that cast votes for the participants to the computer system for the television program. The demographic data may be anonymized so that personally identifiable information (e.g., name, address) is not sent to the computer system for the television program. Alternatively, or additionally, the demographic data may include at least some personally identifiable information of players (e.g., email addresses, screen names) for identification and/or verification purposes.

In some embodiments, the voting module 308 transmits (2808) voting trends to the computer system for the television program. For example, the voting module 308 may calculate voting trends based on player locations, based on time of day, based on a day of the week, based on the participant, and the like. Note that the voting trends may be determined by the data analysis module 310.

Figure 29:
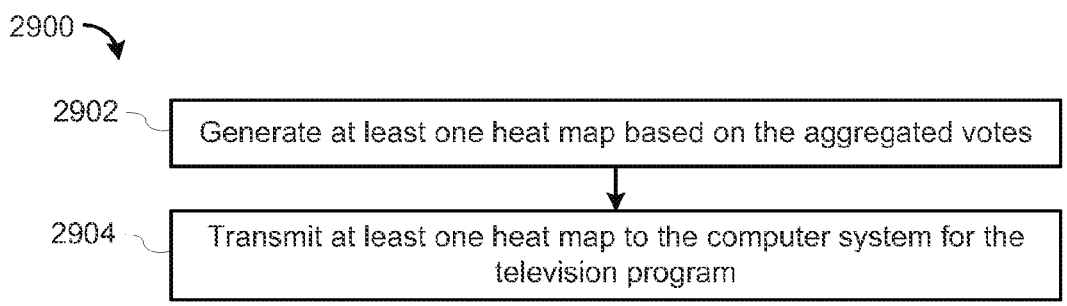
FIG. 29 is a flowchart of a method for providing a heat map of votes, according to some embodiments.

In some embodiments, the voting module 308 generates heat maps of votes. FIG. 29 is a flowchart of a method 2900 for providing a heat map of votes, according to some embodiments. The voting module 308 generates (2902) at least one heat map based on the aggregated votes and transmits (2904) at least one heat map to the computer system for the television program. Note that the data analysis module 310 may analyze and correlate the vote data so that the voting module 308 may generate the at least one heat map. In some embodiments, a respective heat map includes a heat map for a predetermined geographical region or a heat map for a predetermined demographic of players of the game (e.g., age, sex, occupation).

Figure 30:
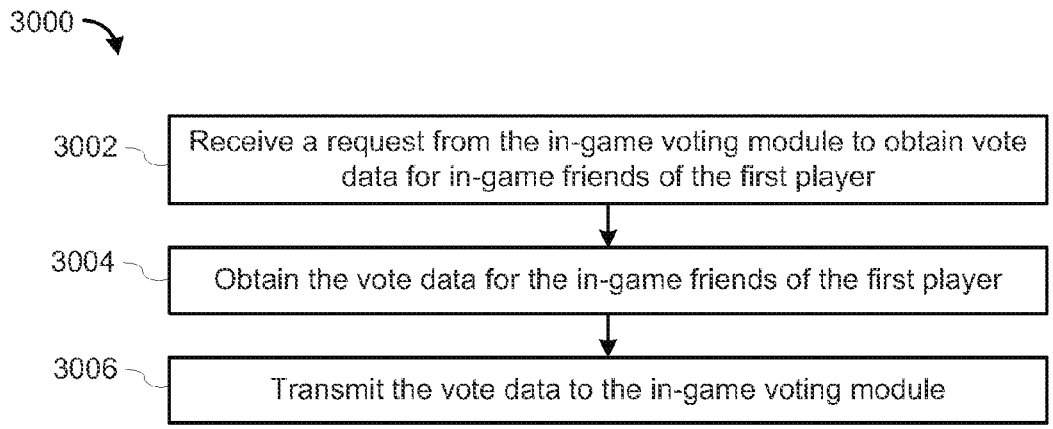
FIG. 30 is a flowchart of a method for providing vote data for friends of a player of a game, according to some embodiments.

Games often provide mechanisms for players to view statistics about each other. These mechanisms may foster competition between players and encourage the players to spend more time playing the game. For example, a game may list achievements completed by friends of the player. These players can then track their progress relative to each other. To encourage players of a game to cast votes through the in-game voting module 306, some embodiments provide vote data for friends of the player to the player via the in-game voting module 306. FIG. 30 is a flowchart of a method 3000 for providing vote data for friends of a player of a game, according to some embodiments. The voting module 308 receives (3002) a request from the in-game voting module 306 to obtain vote data for in-game friends of the player. In some embodiments, the vote data includes information about votes cast by the in-game friends of the player.

The voting module 308 obtains (3004) the vote data for the in-game friends of the player. For example, the voting module 308 may obtain a list of in-game friends for the player and query the data structure for storing votes cast by a player of a game illustrated in and described with respect to FIG. 14 to obtain vote data for the in-game friends of the player.

The voting module 308 transmits (3006) the vote data to the in-game voting module 306. The in-game voting may then present the vote data for the friends of the player to the player of the game.

Figure 31:
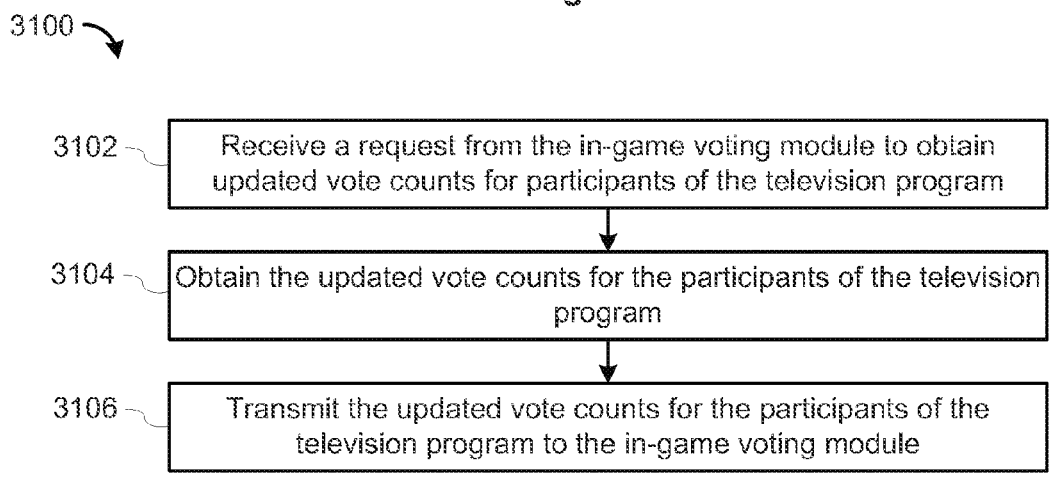
FIG. 31 is a flowchart of a method for providing updated vote counts, according to some embodiments.

In some embodiments, vote counts for voting sessions are provided to players of the game. FIG. 31 is a flowchart of a method 3100 for providing updated vote counts, according to some embodiments. The voting module 308 receives (3102) a request from the in-game voting module 306 to obtain updated vote counts for participants of the TV program. The voting module 308 obtains (3104) the updated vote counts for the participants of the TV program and transmits (3106) the updated vote counts for the participants of the TV program to the in-game voting module 306.

Figure 32:
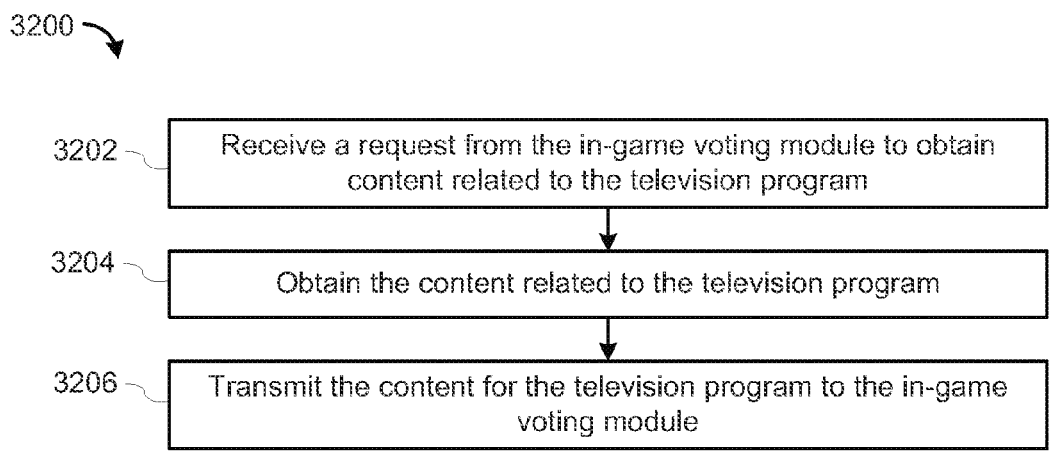
FIG. 32 is a flowchart of a method for providing content for a television program, according to some embodiments.

In some embodiments, the in-game voting module 306 provides the player of the game with content for a TV program. FIG. 32 is a flowchart of a method 3200 for providing content for a TV program, according to some embodiments. The voting module 308 receives (3202) a request from the in-game voting module 306 to obtain content related to the TV program. The voting module 308 obtains (3204) the content related to the TV program. For example, the voting module 308 may obtain the content related to the TV program from the TV network server 108 and/or from the data structures illustrated in FIGS. 8, 10-14, and 16. In some embodiments, the content related to the TV program includes biographies of the participants of the TV program and multimedia items for the television program (e.g., text, images, videos, audio). The voting module 308 then transmits (3206) the content for the TV program to the in-game voting module 306.

Figure 33:
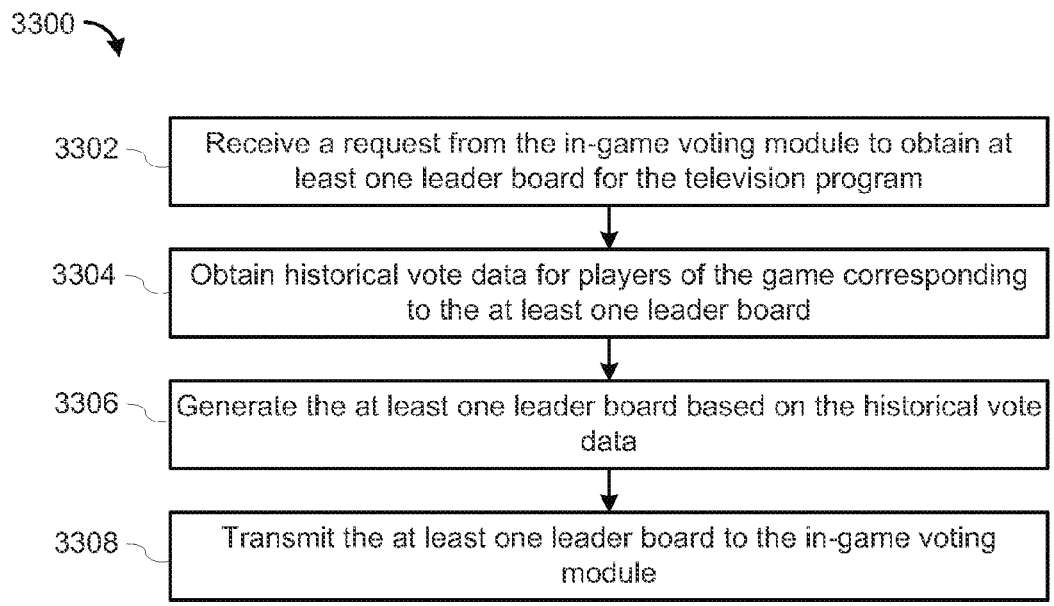
FIG. 33 is a flowchart of a method for providing a leader board for a television program, according to some embodiments.

In some embodiments, the in-game voting module 306 provides the player of the game with at least one leader board. FIG. 33 is a flowchart of a method 3300 for providing a leader board for a television program, according to some embodiments. The voting module 308 receives (3302) a request from the in-game voting module 306 to obtain at least one leader board for the TV program, where the at least one leader board for the TV program includes vote statistics for players of the game with respect to the TV program. In some embodiments, the at least one leader board includes at least one of a leader board with respect to all players of the game, a leader board with respect to in-game friends of the player of the game, and a leader board with respect to a predetermined demographic of players of the game.

The voting module 308 obtains (3304) historical vote data for players of the game corresponding to the at least one leader board. For example, the voting module 308 may obtain the historical vote data from the data structure for storing votes illustrated in and described with respect to FIG. 14.

The voting module 308 generates (3306) the at least one leader board based on the historical vote data.

The voting module 308 transmits (3308) the at least one leader board to the in-game voting module 306. The in-game voting module 306 may then present the at least one leader board to the player of the game.

Figure 34:
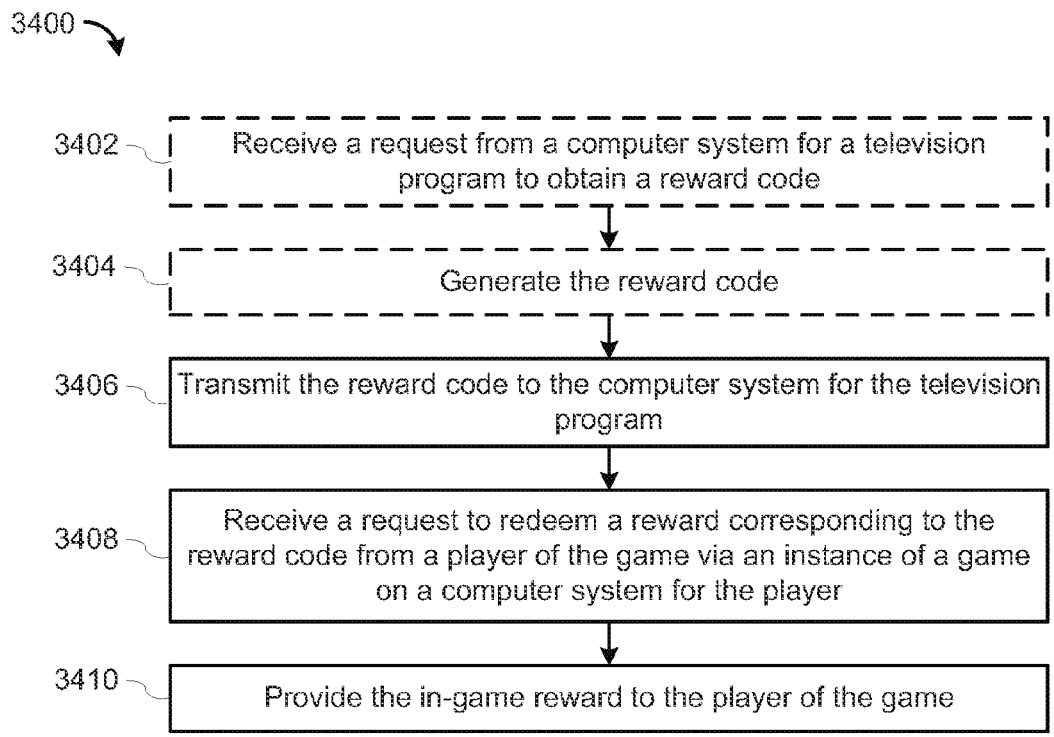
FIG. 34 is a flowchart of a method for rewarding players of a game for voting for participants of a television program, according to some embodiments.

In some cases, a player of the game may cast votes for participants of the TV program outside of the game itself. Thus, in some embodiments, in-game rewards are provided to players of a game for voting for participants of a TV program. For example, in-game rewards may include assets (e.g., in-game currency, resources, buildings, etc.) and experience points used to increase the level of the player of the game. FIG. 34 is a flowchart of a method 3400 for rewarding players of a game for voting for participants of a TV program, according to some embodiments. The voting module 308 transmits a reward code to a computer system for a television program (e.g., the TV network server 108). In some embodiments, the reward code to be presented by the computer system for a TV program to a player of a game is to reward the player for casting a vote for a participant in the TV program.

The voting module 308 receives (3408) a request to redeem a reward corresponding to the reward code from a player of the game via an instance of a game on a computer system for the player. The player of the game may enter the reward code via a user interface element of the game interface that is generated by the in-game voting module 306. For example, the user interface element may include an asset in the game (e.g., a building, a non-player character, etc.) and/or a sponsored dialog box (e.g., a pop-up window sponsored by a product manufacturer, etc.).

The voting module 308 provides (3410) the in-game reward to the player of the game. The voting module 308 may record the redemption of the reward code in the data structure for storing data for a player that has redeemed a reward code illustrated in and described with respect to FIG. 19.

Figure 35:
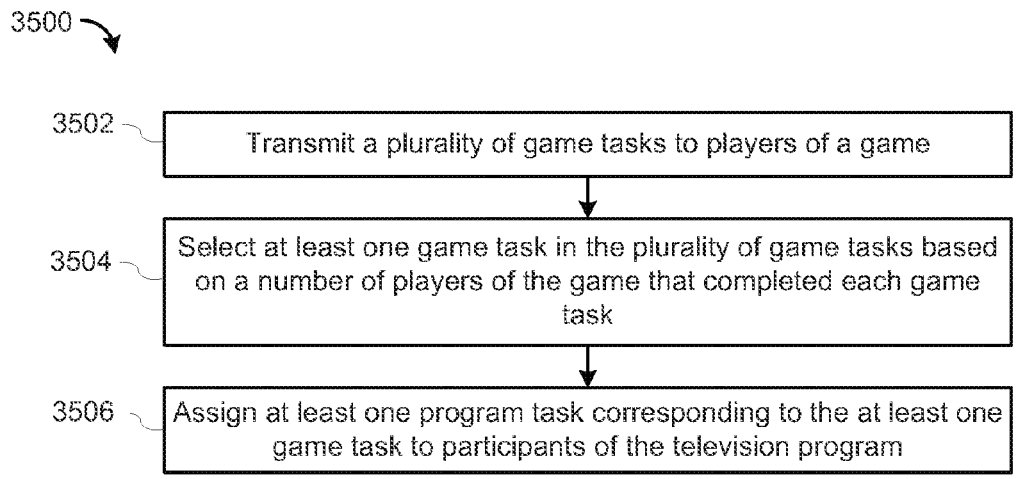
FIG. 35 is a flowchart of a method for assigning tasks to participants of a television program, according to some embodiments.

In some embodiments, prior to transmitting (3406) the reward code to the computer system for the TV program, the voting module 308 receives (3402) a request from the computer system for the television program (e.g., the TV network server 108) to obtain the reward code. In response to the request, the voting module 308 generates (3404) the reward code. The reward code may be stored in the data structure for storing rewards illustrated in and described with respect to FIG. 18.

in some embodiments, tasks for participants of a TV program are assigned based on in-game tasks completed by players of a game. FIG. 35 is a flowchart of a method 3500 for assigning tasks to participants of a television program, according to some embodiments. The voting module 308 transmits (3502) a plurality of in-game tasks to players of a game. The in-game tasks may be stored in the data structure for storing in-game tasks illustrated in and described with respect to FIG. 16. In some embodiments, each player of the game plays an instance of the game on a computer system (e.g., the computer system 104). In some embodiments, each in-game task corresponds to a task performable by participants in a television program.

The voting module 308 selects (3504) at least one in-game task in the plurality of game tasks based on a number of players of the game that completed each in-game task. The voting module 308 may determine the number of players of the game that completed each in-game task by analyzing data stored in the data structure for storing data for in-game tasks completed by players of the game illustrated in and described with respect to FIG. 17.

The voting module 308 assigns (3506) at least one program task corresponding to the at least one game task to participants of the TV program. The voting module 308 may obtain the at least one program task from the data structure for storing in-game tasks illustrated in and described with respect to FIG. 16. In some embodiments, the at least one program task is to be performed by the participants while performing on the TV program.

Figure 36:
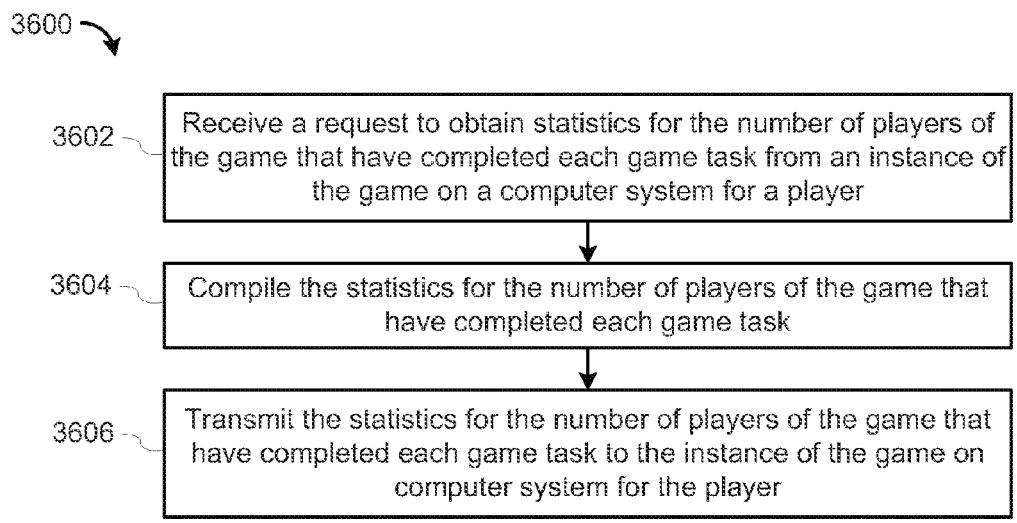
FIG. 36 is a flowchart of a method for providing statistics for players who completed in-game tasks, according to some embodiments.

In some embodiments, the voting module 308 provides statistics for the number of players of the game that have completed in-game tasks. FIG. 36 is a flowchart of a method 3600 for providing statistics for players who completed in-game tasks, according to some embodiments. The voting module 308 receives (3602) a request to obtain statistics for the number of players of the game that have completed each in-game task from an instance of the game on a computer system for a player (e.g., the computer system 104). The voting module 308 compiles (3604) the statistics for the number of players of the game that have completed each in-game task. The voting module 308 transmits (3606) the statistics for the number of players of the game that have completed each in-game task to the instance of the game on a computer system for the player.

Figure 37:
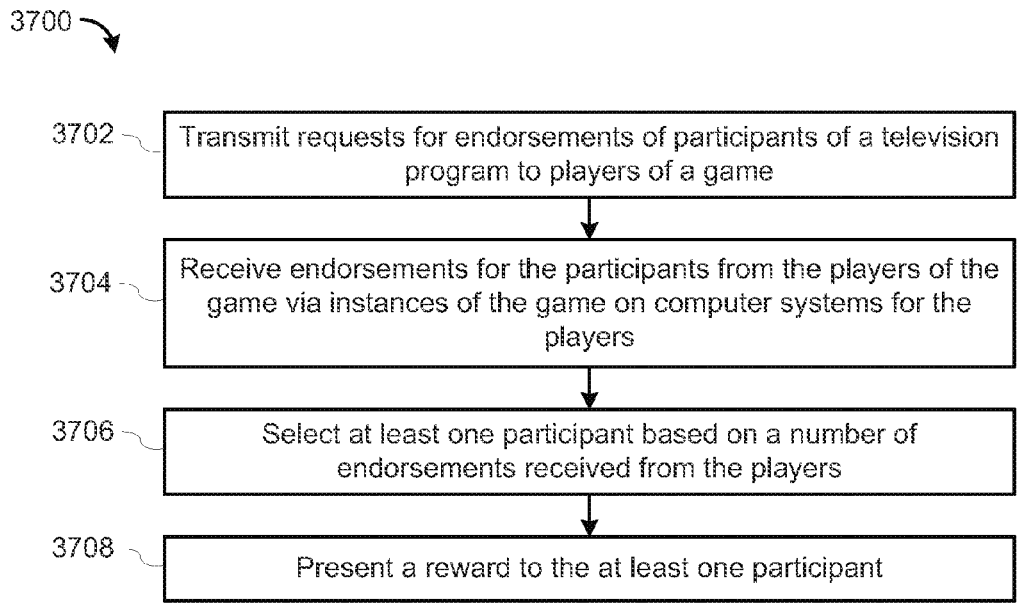
FIG. 37 is a flowchart of a method for obtaining endorsements for participants of a television program, according to some embodiments.

In some embodiments, participants of the TV program are given rewards for receiving endorsements from players of the game. FIG. 37 is a flowchart of a method 3700 for obtaining endorsements for participants of a television program, according to some embodiments. The voting module 308 transmits (3702) requests for endorsements of participants of a television program to players of a game. In some embodiments, each player of the game plays an instance of the game on a computer system (e.g., the computer system 104). A participant may initiate the requests for endorsements via the voting module 308. Note that the participants of the TV program may submit requests for endorsements via the game server 102.

The voting module 308 receives endorsements (3704) for the participants from the players of the game via instances of the game on computer systems for the players. For example, the players of the game may use the in-game voting module 306 to submit endorsements for participants of the TV program.

The voting module 308 selects (3706) at least one participant based on a number of endorsements received from the players. In some embodiments, the voting module 308 selects a participant that received the most endorsements from the players. In some embodiments, the voting module 308 selects participants that received endorsements from at least a predetermined number of players.

The voting module 308 presents (3708) a reward to the at least one participant, where the reward is usable by the at least one participant while performing in the TV program. In some embodiments, the reward includes additional cash to be used in the television program. In some embodiments, the reward includes additional ingredients for a cooking recipe to be used in the television program. In some embodiments, the reward includes an additional song to be performed in the television program. In some embodiments, the reward includes additional time to complete a task in the television program. In some embodiments, the reward includes a bonus task in the television program. In some embodiments, the reward includes assistance from a non-participant of the television program.

Figure 38:
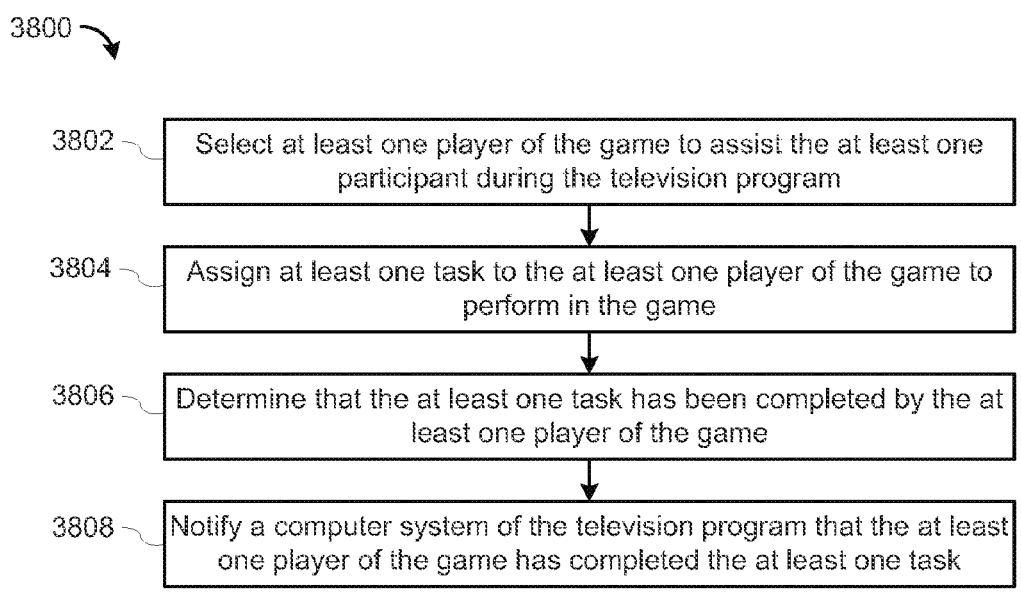
FIG. 38 is a flowchart of a method for providing an in-game task for a player of a game to perform, according to some embodiments.

In some embodiments, a player of a game is selected to assist a participant of a TV program. In some embodiments, the voting module 308 provides in-game tasks for a player of a game to perform in order to assist the participant of the TV program. FIG. 38 is a flowchart of a method 3800 for providing an in-game task for a player of a game to perform, according to some embodiments. The voting module 308 selects (3802) at least one player of the game to assist the at least one participant during the TV program. The voting module 308 assigns (3804) at least one in-game task to the at least one player of the game to perform in the game. The voting module 308 determines (3806) that the at least one task has been completed by the at least one player of the game. The voting module 308 notifies (3808) a computer system of the TV program the TV network server 108) that the at least one player of the game has completed the at least one in-game task.

Exemplary Machine

Figure 40:
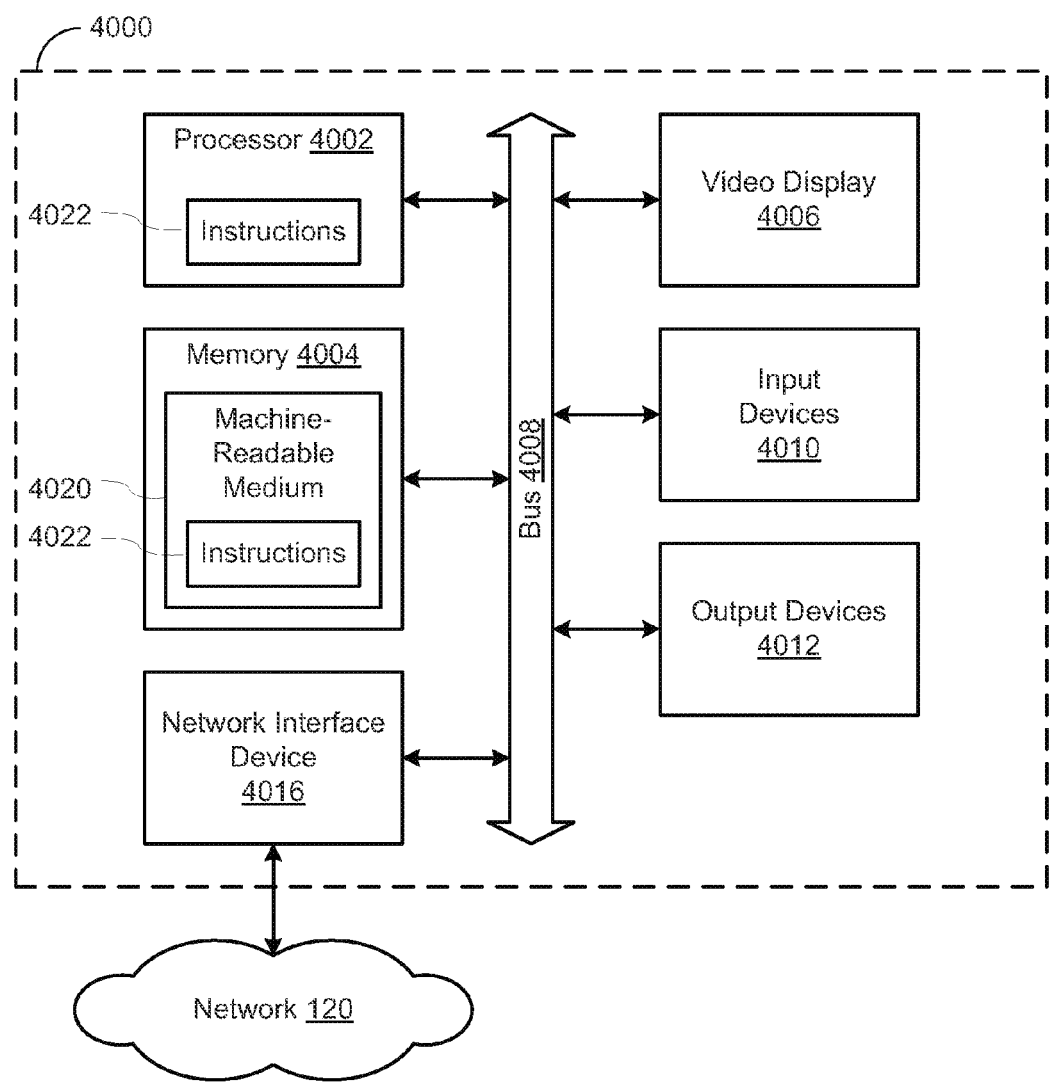
FIG. 40 is a block diagram illustrating an exemplary machine, according to some embodiments.

FIG. 40 depicts a block diagram of a machine in the example form of a computer system 4000 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The computer system 4000 may include, but is not limited to, a desktop computer system, a laptop computer system, a server, a mobile phone, a smart phone, a personal digital assistant (PDA), a gaming console, a portable gaming console, a set it box, a camera, a printer, a television set, or any other electronic device.

The machine is capable of executing a set of instructions (sequential or otherwise that specify actions to be taken by that machine. Further, white only a single machine is illustrated, the term "machine" shall also be taken to include any collection of machines that individually or jointly execute a set (or multiple sets) of instructions to perform any one or more of the methodologies discussed herein.

The example of the computer system 4000 includes a processor 4002 (e.g., a central processing unit (CPU), a graphics processing unit (GPU) or both), and memory 4004, which communicate with each other via bus 4008. Memory 4004 includes volatile memory devices (e.g., DRAM, SRAM, DDR RAM, or other volatile solid state memory devices), non-volatile memory devices (e.g., magnetic disk memory devices, optical disk memory devices, flash memory devices, tape drives, or other non-volatile solid state memory devices), or a combination thereof. Memory 4004 may optionally include one or more storage devices remotely located from the computer system 4000. The computer system 4000 may further include a video display unit 4006 (e.g., a plasma display, a liquid crystal display (LCD) or a cathode ray tube (CRT)). The computer system 4000 also includes input devices 4010 (e.g., keyboard, mouse, trackball, touchscreen display), output devices 4012 (e.g., speakers), and a network interface device 4016. The aforementioned components of the computer system 4000 may be located within a single housing or case (e.g., as depicted by the dashed lines in FIG. 40). Alternatively, a subset of the components may be located outside of the housing. For example, the video display unit 4006, the input devices 4010, and the output devices 4012 may exist outside of the housing, but be coupled to the bus 4008 via external ports or connectors accessible on the outside of the housing.

Memory 4004 includes a machine-readable medium 4020 on which is stored one or more sets of data structures and instructions 4022 (e.g., software) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions 4022 may also reside, completely or at least partially, within memory 4004 and/or within the processor 4002 during execution thereof by computer system 4000, with memory 4004 and processor 4002 also constituting machine-readable, tangible media.

The data structures and instructions 4022 may further be transmitted or received over network 120 via network interface device 4016 utilizing any one of a number of well-known transfer protocols (e.g., HyperText Transfer Protocol (HTTP)).

Certain embodiments are described herein as including logic or a number of components, modules, or mechanisms. Modules may constitute either software modules e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 4000) or one or more hardware modules of a computer system (e.g., a processor 4002 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured as a special-purpose processor, such as a field programmable gate array (FPGA) or an application-specific integrated circuit (ASIC)) to perform certain operations. A hardware module may also comprise programmable logic or circuitry (e.g., as encompassed within a processor 4002 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or perform certain operations described herein. Considering embodiments in which hardware modules are temporarily configured (e.g., programmed), each of the hardware modules need not be configured or instantiated at any one instance in time. For example, where the hardware modules comprise a processor 4002 configured using software, the processor 4002 may be configured as respective different hardware modules at different times. Software may accordingly configure a processor 4002, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 4002 that are temporarily configured (e.g., by software, code, and/or instructions stored in a machine-readable medium) or permanently configured to perform the relevant operations. Whether temporarily or permanently configured, such processors 4002 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 4002 or processor-implemented (or computer-implemented) modules. Similarly, at least some of the operations of a method may be governed by instructions that are stored in a computer readable storage medium and executed by one or more processors 4002 or processor-implemented (or computer-implemented) modules. The performance of certain of the operations may be distributed among the one or more processors 4002, not only residing within a single machine, but deployed across a number of machines. In some example embodiments, the processors 4002 may be located in a single location (e.g., within a home environment, an office environment or as a server farm), while in other embodiments the processors 4002 may be distributed across a number of locations.

While the embodiment(s) is (are) described with reference to various implementations and exploitations, it will be understood that these embodiments are illustrative and that the scope of the embodiment(s) is not limited to them. In general, techniques for the embodiments described herein may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computer-implemented method comprising:
transmitting code for a computer-implemented game to a client device, the computer implemented game including an in-game voting module that allows a player of the computer implemented game to cast one or more votes for participants in a television program;
receiving a request to vote for participants in the television program from the in-game voting module;
allocating, using at least one processor of a machine, at least one vote to the player of the computer-implemented game in response to the request to vote by:
accessing game data for the player of the computer-implemented game;
and allocating the at least one vote to the player of the computer-implemented game based on in-game tasks performed by the player, the performed in-game tasks being determined from the game data; and
notifying the in-game voting module of the at least one vote allocated to the player of the game.

2. The computer-implemented method of claim 1, wherein the allocating the at least one vote to the player of the computer-implemented game includes:
obtaining a voting history for the player of the computer-implemented game with respect to the television program; and
allocating the at least one vote to the player of the game based on the voting history for the player of the computer-implemented game.

3. The computer-implemented method of claim 2, wherein the player is allocated a first predetermined number of votes if the player voted for a first participant that received a highest number of votes in a prior voting session.

4. The computer-implemented method of claim 3, wherein the player is allocated a second predetermined number of votes if the player voted for a second participant that did not receive the highest number of votes in a prior voting session, the second predetermined number of votes being less than the first predetermined number of votes.

5. The computer-implemented method of claim 1, wherein allocating the at least one vote to the player of the computer-implemented game includes:
determining that the player of the computer-implemented game purchased votes using currency; and
allocating the at least one vote to the player of the computer-implemented game from at least a portion of the purchased votes.

6. The computer-implemented method of claim 5, wherein the currency is selected from the group consisting of:
   out-of-game currency; and
   in-game currency.

7. The computer-implemented method of claim 1, wherein allocating the at least one vote to the player of the game includes:
   determining that other players of the computer-implemented game have donated votes to the player of the computer-implemented game; and
   allocating the at least one vote to the player of the game from at least a portion of the donated votes.

8. The computer-implemented method of claim 1, wherein the in-game voting module determines a total number of allocated votes to the player.

9. The computer-implemented method of claim 1, wherein the in-game voting module allows the player to cast a number of votes based on a number of votes allocated to the player.

10. The computer-implemented method of claim 1, wherein the computer-implemented game is a network-based social game.

11. A system to allocate votes for participants in a television program, the system comprising:
   a processor-implemented game module configured to:
   transmit code for a game to a client device, the game including an in-game voting module that allows a player of the game to cast one or more votes for participants in a television program; and
   a processor-implemented voting module configured to:
   receive a request to vote for participants in the television program from the in game voting module;
   allocate at least one vote to the player of the game in response to the request to vote, with the voting module being further configured to:
   access game data for the player of the computer-implemented game;
   and allocate the at least one vote to the player of the computer-implemented game based on in-game tasks performed by the player, the performed in game tasks being determined from the game data; and
   notify the in-game voting module of the at least one vote allocated to the player of the game.

12. The system of claim 11, wherein the voting module is further configured to:
   obtain a voting history for the player of the game with respect to the television program; and
   allocate the at least one vote to the player of the game based on the voting history for the player of the game.

13. The system of claim 11, wherein the voting module is further configured to:
   determine that the player of the game purchased votes using currency; and
   allocate the at least one vote to the player of the game from at least a portion of the purchased votes.

14. The system of claim 13, wherein the currency is selected from the group consisting of:
   out-of-game currency; and
   in-game currency.

15. The system of claim 11, wherein the voting module is further configured to:
   determine that other players of the game have donated votes to the player of the game; and
   allocate the at least one vote to the player of the game from at least a portion of the donated votes.

16. The system of claim 11, wherein the voting module is further configured to determine a total number of allocated votes to the player.

17. The system of claim 11, wherein the voting module is further configured to allow the player to cast a number of votes based on a number of votes allocated to the player.

18. A computer-readable storage medium storing at least one program that, when executed by at least one processor, cause the at least one processor to perform operations comprising:
   transmitting code for a game to a client device, the game including an in-game voting module that allows a player of the game to cast votes for participants in a television program;
   receiving a request to vote for participants in the television program from the in-game voting module;
   allocating at least one vote to the player of the game in response to receiving the request to vote, by:
   accessing game data for the player of the computer-implemented game; and
   allocating the at least one vote to the player of the computer-implemented game based on in-game tasks performed by the player, the performed in-game tasks being determined from the game data; and
   notifying the in-game voting module of the at least one vote allocated to the player of the game.

* * * * *